US007182861B2

(12) United States Patent
Sugiyama et al.

(10) Patent No.: US 7,182,861 B2
(45) Date of Patent: Feb. 27, 2007

(54) SYSTEM FOR SEPARATING ELECTROPHOTOGRAPHIC CARRIER COMPOSITIONS AND RECYCLING THE COMPOSITIONS

(75) Inventors: Kunitoshi Sugiyama, Numazu (JP); Yoshihiko Itoh, Fuji (JP); Hideyuki Santoh, Numazu (JP); Kunio Arai, Sendai (JP); Tadafumi Ajiri, Sendai (JP)

(73) Assignee: Ricoh Company, Ltd., Tokyo (JP)

( * ) Notice: Subject to any disclaimer, the term of this patent is extended or adjusted under 35 U.S.C. 154(b) by 631 days.

(21) Appl. No.: 10/197,274

(22) Filed: Jul. 16, 2002

(65) Prior Publication Data

US 2003/0129103 A1 Jul. 10, 2003

Related U.S. Application Data

(62) Division of application No. 09/628,738, filed on Jul. 28, 2000, now Pat. No. 6,464,797.

(30) Foreign Application Priority Data

Jul. 28, 1999 (JP) ................................ 11-213015
Jan. 31, 2000 (JP) ................................ 2000-22778

(51) Int. Cl.
*B08B 7/04* (2006.01)
*B01J 19/00* (2006.01)
*B01J 19/02* (2006.01)

(52) U.S. Cl. ...................... 210/178; 210/181; 210/205; 210/222; 210/223; 210/761; 422/138; 422/186.01; 422/186.1; 422/188; 422/198; 422/208; 422/226; 422/232; 422/239; 422/242

(58) Field of Classification Search ................ 210/175, 210/178, 181, 205, 222, 223, 761; 422/129, 422/138, 186.01, 186.1, 188, 198, 208, 225, 422/226, 232, 239, 242
See application file for complete search history.

(56) References Cited

U.S. PATENT DOCUMENTS 4,129,136 A * 12/1978 Kapoor ........................ 134/19
6,107,532 A 8/2000 Saito et al.

(Continued)

FOREIGN PATENT DOCUMENTS

JP 4712286 6/1972

(Continued)

OTHER PUBLICATIONS

Research report "Advanced Research Project for utilizing supercritical liquid compositions", issued in 1997 by NEDO (New Energy Development Organization), Japan.

*Primary Examiner*—David A. Reifsnyder
(74) *Attorney, Agent, or Firm*—Cooper & Dunham LLP

(57) ABSTRACT

A method for use in two-components electrostatic image developers is disclosed, in which secure separation of a carrier coating resinous materials from a core magnetic material is achieved without affecting the properties of the core materials through process steps benign to the environment in super- or sub-critical water compositions under the conditions of a temperature of 300° C. or more and a pressure of 20 MPa. The core magnetic material is subsequently recycled for forming carrier. This method may also be useful for processing waste including magnetic materials with silicone resin coating.

24 Claims, 10 Drawing Sheets

U.S. PATENT DOCUMENTS 6,255,529 B1 * 7/2001 Nagase et al. .............. 210/761

FOREIGN PATENT DOCUMENTS

| | | |
|---|---|---|
| JP | 3500264 | 1/1991 |
| JP | 531000 | 2/1993 |
| JP | 553000 | 3/1993 |
| JP | 5127432 | 5/1993 |
| JP | 5197211 | 8/1993 |
| JP | 5216282 | 8/1993 |
| JP | 5216283 | 8/1993 |
| JP | 6149132 | 5/1994 |
| JP | 6194881 | 7/1994 |
| JP | 6261948 | 9/1994 |
| JP | 7114221 | 5/1995 |
| JP | 7306321 | 11/1995 |
| JP | 887137 | 4/1996 |
| JP | 977905 | 3/1997 |
| JP | 9111249 | 4/1997 |
| JP | 1024274 | 1/1998 |
| JP | 1080674 | 3/1998 |
| JP | 1087872 | 4/1998 |
| JP | 10137775 | 5/1998 |

* cited by examiner

SYSTEM FOR SEPARATING ELECTROPHOTOGRAPHIC CARRIER COMPOSITIONS AND RECYCLING THE COMPOSITIONS

CROSS REFERENCE TO RELATED APPLICATION

This application is a divisional of U.S. Ser. No. 09/628,738, filed Jul. 28, 2000, now U.S. Pat. No. 6,464,797, issued Oct. 15, 2002, the entire contents of which are incorporated by reference herein.

BACKGROUND

1. Field

This patent specification relates to a method of recycling two-components electrostatic image developers for use in electrophotography and electrostatic recording, capable of separating carrier coating materials from core materials of a carrier composite which includes at least metal containing magnetic materials and resinous materials, to subsequent recycling as a carrier, through processes benign to the environment and without affecting the properties of the core materials.

2. Discussion of the Background

In electrophotography, developers are used to render a latent image visible. The developed image is then transferred to paper and fixed to create resulting copy. Of these developers, two-component dry developers are known, which contain both toner and carrier.

Minute particles of the toner are held on the surface of the carrier particles of relatively large sizes. In addition to the magnetic force, which acts between the carrier particles themselves and is utilized for carrying toner particles, there are electrostatic and adhesive forces in the two-component development.

The adhesive force between the charged toner and the oppositely charged carrier bead is overcome by the development force produced on the toner by the photoreceptor surface charge distribution of a latent image. As a result, the toner particles are transferred selectively onto the photoreceptor to form the developed electrostatic image. Subsequently, the electrostatic image is fixed as indicated above.

The carrier for use in two-component dry developers of the present disclosure is made of at least magnetic particles and resinous materials. Examples of the carrier structure may also include, among others, layers of resinous materials coated on top of magnetic particles having relatively large sizes, and magnetic particles with a relatively small sizes, dispersed uniformly in the resinous materials.

The carrier particles are not intended to be consumed in use and generally are used repeatedly, with toner particles added to replenish those used up in producing copies. Therefore, it is desirable for the carrier to maintain its capability to impart, through frictional charging, an appropriate polarity and a sufficient amount of charge to toner particles throughout the repeated usage.

Previously known developers, however, tend to change their charging characteristics, due to factors such as collision with either toner particles themselves or walls of the developer housing. This can result in carrier surface changes such as cracks, fracturing and abrasion of carrier coatings, and compression of toner particles, thereby leading to so-called ‘spent’ toner. Such deteriorating effects reveal themselves in progressive loss of image quality with time in use and may ultimately require the replacement of the total developer package.

In order to alleviate these deteriorating effects, a variety of improvements have been made. For example, the selection of resinous materials and/or adhesion between the surface of the magnetic materials and the coating resins have been examined so as to improve mechanical strength, to thereby reduce cracks, fracture and abrasion of carrier coatings.

Among numerous proposals made regarding resinous materials, resins of crosslinking type have been proposed that are particularly capable of increasing the mechanical strength. In general, these resins include, but are not limited to, acrylic resins, polyester resins and silicone resins, used in combination with a variety of cross linking agents and appropriate additives.

Illustrative examples of the proposed resins and methods include one using crosslinking polycarbodiimide resins discussed in Japanese Laid-Open Patent Application No. 5-127432, a method of crosslinking acrylic resins having specific properties and structure, discussed in Japanese Laid-Open Patent Applications Nos. 5-216282 and 5-216283; a method of forming a composite crosslinking structure consisting of urethane and urea bonds, discussed in Japanese Laid-Open Patent Application No. 5-197211; a method using a silicone resin having specified silane coupling agents, discussed in Japanese Laid-Open Patent Application No. 7-114221; and a method of crosslinking a alcohol hydroxy group containing resin with a phenolic hydroxy group containing resin, discussed in Japanese Laid-Open Patent Application No. 8-87137.

A further method is also proposed for polymerizing resinous materials directly onto the surface of magnetic materials. This is exemplified by a method of interfacially polymerizing and subsequently cross-linking resinous materials coated on the surface of carrier core materials, discussed in Japanese Laid-Open Patent Application No. 6-194881.

The resultant coated materials formed by these methods, however, have drawbacks such as difficulties in separating resinous materials from the core, since their mechanical strength and stability against thermal stress are increased by these methods.

Furthermore, a method is proposed for coating various resinous materials on the surface of magnetic materials to prevent spent toner particles. For example, in a method discussed in Japanese Laid-Open Patent Application No. 62-61948, the hardness of coated silicone resin is said to be increased.

As described hereinabove, many carriers for use in two-component dry developers are formed with cross-linked resinous materials as the coating resin so as to increase mechanical strength and thus to reduce spent toners. As a result, a strong bond is generally formed between the resinous materials and core materials.

The aforementioned degraded developers have been collected to be subsequently discarded. Along with the recent increase in industrial waste and concomitant environmental destruction, recycling of the developers is one of the problems awaiting solution.

As for recovering these developers, two methods have been proposed, one is to remove spent toner from the carrier surface so as to restore developer characteristics, and the other is to remove resinous materials previously coated on carrier to thereby recover core materials for recycled use.

The former method is exemplified by Japanese Laid-Open Patent Application No. 6-149132, in which spent toner particles compressed onto the carrier surface are removed by either heating or cleansing with solvents so as to recycle core materials. In this method, previously coated resin materials are retained and used as a portion of recycled toner. According to this method, therefore, toners themselves which are once spent or degraded, may be recovered for recycled use.

However, the degradation in the above-noted developer characteristics are often caused to some extent not only by spent toners but also by cracking, fracture and abrasion of carrier coatings, to a certain extent. In such a case, carrier properties can not be restored by removing spent toners alone for cycled use. In addition, there are some spent toners which are difficult to remove by the above method. Therefore, further methods are awaited which are more effective for removing the toners. Furthermore, since solvents are used during cleansing processes in the above method and these solvents may necessitate after treatments, methods are again awaited which are more benign to the environment.

The other method is exemplified by Japanese Laid-Open Patent Application No. 47-12286, in which resinous materials previously coated on carrier are removed so as to recover core materials for recycled use. In this process, collected developers are recycled after heating at a relatively high temperature (1000° F.). When this method is applied to carriers coated with thermoplastic resins such as, for example, acrylic resin, even coated resin material can be removed. Therefore, even developers previously degraded not only by spent toners but also by cracking, fracture and abrasion of the coating, can be recoated to be used as core materials for forming recycled carriers.

However, when the above method is applied to a carrier which contains ferrite materials as its core, comprising metal suboxides with inherent magnetic properties, there are disadvantages such as difficulties in restoring the characteristics of these carriers. In addition, it is desirable this method be carried out in a manner that also recycles the heat generated during processing, to thereby reduce undesirable environmental effects. However, since inflammable materials are among the carrier constituents such as, for example, combustion heat generating resins, efficient thermal recycling may not be achieved during the carrier recovery processes.

In addition, when this method is applied to a carrier system which contains thermosetting resin as its coating, a disadvantage is that the thermosetting resin cannot be sufficiently removed from the core.

Furthermore, it has been found that when some of the remainder of core coating resin and/or byproducts by the processing remain adhered, a recycled carrier formed using the above core material has less desirable characteristics compared with a carrier formed using a virgin core material.

That is, the developer characteristics of a developer using such recycled core material are clearly inferior to those of a developer using virgin core material. The difference in characteristics is less when the previously coated resin is removed more thoroughly. Therefore, in order for the developer characteristics of these two developers to be comparable, it is desirable that the residual core coating resin be less, or that the removal rate of the coating resin be greater.

In two-component developers, therefore, the known methods utilized for separating the carrier coating materials for recycling as carriers are not satisfactory in practice, since these methods are not capable of removing the resin materials in a manner benign to the environment and, in addition, may give rise to degrading effects on core properties.

In other words, the conditions in the previously known methods do not meet simultaneously the goals of both removing the resinous material which is tightly bonded chemically and mechanically to the core and retaining desirable properties of magnetic materials used in the core.

None of methods has previously disclosed has focused on the recovery of the magnetic materials of magnetic particles. In particular, this is the case for magnetic material comprising metal suboxide particles having a specific structure and resinous materials, so as not to induce either oxidation or reduction reaction, still retaining crystalline structure thereof and preventing the degradation of their inherent magnetic properties.

That is, since magnetic materials for use in forming core materials are generally composed of substances which are oxidized with relative ease and which have a specific crystalline structure, it is desirable to obviate any chemical change in, for example, oxidation state and/or crystalline structure during process steps.

In this respect, Japanese Laid-Open Patent Application No. 5-53000 discusses the decomposition of resinous materials in water under super- or sub-critical conditions. It is shown that a plurality of resinous materials can be decomposed through hydrolysis and/or pyrolysis to result in their monomer components.

In Japanese Laid-Open Patent Application No. 10-24274, a method is also discussed of decomposing especially thermosetting resins in water under super- or sub-critical conditions. Further, a method is discussed of processing especially chlorine containing wastes in Japanese Laid-Open Patent Application No. 9-111249.

These documents primarily relate to a relatively large amount of resinous wastes and propose several methods for monomerizing the wastes and rendering them harmless, and utilizing the resultant materials as raw materials. The documents also describe appropriate conditions for processing respective resin materials.

Although a plurality of resinous materials are found to be decomposed under super- or sub-critical conditions, as described above, not all practical resinous materials can be decomposed.

A research report "Advanced Research Project for utilizing supercritical liquid compositions", issued in 1997 by NEDO (New Energy Development Organization), Japan, discusses results of decomposition of several thermosetting resins. As an example for the thermosetting resins, phenol resin is reported to have a low decomposition rate after processed in a supercritical water composition, which may be indicative of charring of the resin. This report also gives several ranges of appropriate processing conditions that can be applied to respective resinous materials.

Further, in Japanese Laid-Open Patent Applications Nos. 10-80674 and 10-87872, methods in general and details of processing steps are discussed, especially with respect to composite materials comprising fiber reinforced plastics and other selected material used as structural materials for ship building, for example.

These documents relate to treatment processes and processing conditions, as described above, for rather specific materials in respective embodiments of the structure and use of the materials. Although they are primarily concerned with the separation of core materials from resin or fibers, no description could be found of recycling the core materials and the change in the material properties. In particular, no disclosure could be found of methods for recovering magnetic particles from particulate magnetic materials composed of metal suboxide particles having a specific structure and resinous materials, without inducing either oxidation or reduction reaction and still retaining crystalline structure thereof, to thereby prevent the degradation of inherent magnetic characteristics.

In addition, core materials in electrophotographic carriers include magnetic particles formed in a highly designed manner such that their particle size is approximately the same within a predetermined range and the shape is spherical as much as possible. In the above documents, no description could be found regarding the effects on the shape and size of the magnetic particles, which may be caused under super- or sub-critical conditions.

As to an apparatus utilizing super-critical water compositions, a plurality of improvements have been discussed for use in processing wastes. As an example, a flow-through type apparatus using super-critical water compositions is discussed in Japanese Laid-Open Patent Application No. 5-31000. In Japanese Laid-Open Patent Application No. 9-77905, another method is discussed, in which useful materials are recovered thorough feeding wastes with water into a screw type extruder used as a reaction vessel. In Japanese Laid-Open Patent Application No. 3-500264, another method is discussed, in which solid products are recovered after process steps using a plurality of reaction vessels provided in series.

According to these documents, the apparatuses are designed to decompose almost all materials fed there into, then transfer resultant materials with water toward downstream throughout process steps. However, when the method is applied to processing such materials as electrophotographic carriers presently contemplated, other consideration should be included. In such a system, magnetic materials are included as the major ingredient in the materials system being processed, and should remain non-decomposed, with their particle size and properties relatively intact throughout the process steps.

The above documents do not teach satisfactory means of solving problems associated with the above system of, for example, carrier materials in regard to methods of utilizing heat, adhesion of reactant residues onto a reaction vessel, and transfer the materials being processed inside the reaction vessels.

As to the super-critical water processing, there are discussions regarding, for example, processing optical fibers in Japanese Laid-Open Patent Application No. 7-306321, and fiber reinforced plastics in Japanese Laid-Open Patent Application No. 10-87872. In these documents, either oxidation or reduction reaction is induced to some extent and that gives rise to a relatively large amount of fiber residues. However, no description could be found on processing the residues.

As described earlier, the method in the present disclosure is applied to processing a magnetic materials system different from the above optical fiber processing in both shape and material properties, that will give rise to different characteristic problems to be solved. That is, since the present magnetic materials generally comprise substances oxidized with relative ease, and having a specific crystalline structure, it is preferable to prevent changes in the oxidation state and/or in crystalline structure, for example, during recycling process steps.

Although supercritical water compositions are quite effective for materials processing as described above, appropriate adjustment of process conditions is important in order to enhance the effect from the economical point of view, among others. When a relatively large amount of water is used as compared with the materials being processed, costs of heat energy may considerably influence the total costs of the processing. However, a certain amount of water can be still necessary to adequately achieve required changes in the materials being processed. That is, the amount of water would need to sufficient for satisfactorily removing coated resins from electrophotographic carriers.

Therefore, as the amount of water is increased for adequately processing the unit weight of materials being processed, resins is removed more thoroughly. Since this, of course, increases processing costs, it is desirable to find conditions to meet both performance and costs of the removing processes.

According to the forgoing, therefore, it is desirable to provide a method for two-components electrostatic image developers for use in electrophotography, capable of separating a tightly bonded resinous material from a core material. This method is preferably carried out without affecting inherent magnetic characteristics to subsequently recycle the core as carriers by re-coating resinous materials, still retaining desirable materials properties. Namely, such an improved method is desirable, being capable of thoroughly removing a resin material from a core material in a manner benign to the environment and alleviating possible degrading effects on core material properties to thereby recycle the core material.

In addition, it is also desirable to provide an apparatus capable of separating a resinous material from a core magnetic material, alleviating the shortcomings described herein above. Namely, a method is desirable which is capable of thoroughly separating a resin material in a manner economical and also benign to the environment, still alleviating possible degrading effects on core material properties to thereby recycle the core material. For materials system such as an electrophotographic carrier, in particular, which generally includes a relatively large amount of materials being processed, an improved apparatus is desirable which is capable of thoroughly separating a coated material through secure material handling in a reaction vessel with good overall heat energy efficiency.

SUMMARY

Accordingly, it is an object of the present disclosure to provide an improved method and apparatus for separating and recycling carrier material or constituents of two-component dry developers, having most, if not all, of the advantages and features of similar employed methods and apparatuses, while eliminating many of the aforementioned disadvantages.

The following brief description is a synopsis of only selected features and attributes of the present disclosure. A more complete description thereof is found below in the section entitled "Description of the Preferred Embodiments"

A method for separating materials disclosed herein is useful for two-component dry developers comprising a carrier and a toner, in which the carrier comprises at least a magnetic core material and a resinous material for coating the carrier. This method includes process steps for separating the resinous coating material, tightly bound to the magnetic core, from the core materials for subsequent recycling to form a carrier, without degrading the properties of the core material and through processes benign to the environment. Further, this method is characterized by including at least a process step in which the carrier material is treated in water under supercritical or subcritical conditions, preferably at a temperature of at least 300° C. and a pressure of at least 20 Mpa.

In addition, an apparatus is provided for use with two-component dry developers, configured to separate carrier coating materials from core magnetic materials, including a tubular reactor containing a super- or sub-critical water composition, a unit for continuously feeding the super- or sub-critical water composition into the tubular reactor, a unit for continuously disposing liquid and reaction products, a unit for transferring carriers upstream of the flow direction of the water composition, and a unit for providing a magnetic material following process steps.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying photographs and drawings, wherein.

DESCRIPTION OF PREFERRED EMBODIMENTS

Figure 1:
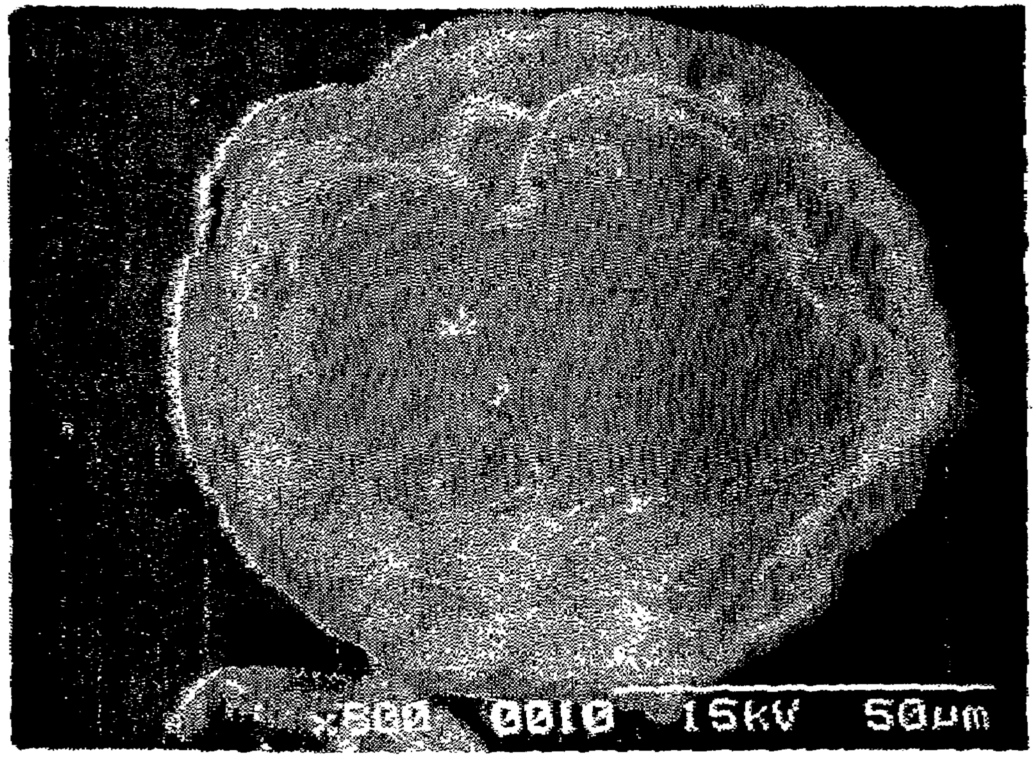
FIG. 1 is a scanning electron microscope photograph of the sample of Example 2.

In the detailed description which follows, specific embodiments are described that are particularly useful with an electrophotographic developer comprising a carrier and a toner. It is understood, however, that the present disclosure is not limited to these embodiments. For example, it is appreciated that the use of critical water composition and methods described herein are also adaptable to other materials separations and other similar processes. Other embodiments will be apparent to those skilled in the art upon reading the following description.

A method disclosed herein is as described in statement (1) is useful for two-component dry developers comprising of a carrier and a toner, characterized by being capable of separating a resinous coating material from a magnetic core material in the carrier by process steps in water under super- or sub-critical conditions.

Statements made herein such as the statement (1), statement (2) and so forth are hereinafter designated simply as (1), (2) and so forth. (2) The process steps may be carried out under the conditions of preferably at a temperature of at least 300° C. and pressure of at least 20 MPa, (3) more preferably at a temperature of at least 400° C. and a pressure of at least 22 MPa, and (4) for a processing time ranging from one minute to 90 minutes.

In two-component dry developers, (5) the carrier being treated in this method is composed of at least a magnetic core material coated with resinous materials, in which (6) a thermosetting resin or (7) a silicone resin may be included as the coating resin and (8) ferrite or magnetite may be included as a material for forming the core. In addition, the process steps of this method may be carried out under either (9) non-reducing or (10) non-oxidizing conditions.

According to another aspect of the method for separation disclosed herein, (11) some of carriers being treated by the method described above have been previously used in two-component dry developers. They are subsequently separated, in which recovered magnetic materials are then rinsed and dried to be re-used as a recycled magnetic material for forming the carrier.

(12) In the above steps of rinsing and drying the recovered magnetic material, the material is sifted successively through at least two screens, one with a predetermined mesh and the other with increased mesh. (13) In the step of the above recycling, virgin magnetic materials may be incorporated into the recycled magnetic materials.

According to yet another aspect of the method for separation disclosed herein, (14) the above processing steps may be carried out by decreasing with time the amount of materials either decomposed or dissolved in super- or sub-critical water compositions with which the developer is in contact during the processing steps.

In addition, the above steps may be carried out (15) by transferring the carriers upstream of the flow direction of the water composition, (16) in which there is decreased with time the amount of materials either decomposed or dissolved in super- or sub-critical water compositions in a reaction vessel.

According to another aspect of the method for separation disclosed herein, (17) an apparatus for separating materials is provided useful for two-component dry developers, configured to separate carrier coating materials from core magnetic materials, including a tubular reactor containing a super- or sub-critical water composition, a unit for continuously feeding the super- or sub-critical water composition into the tubular reactor, a unit for continuously releasing liquid and reaction products, a unit for transferring carriers upstream the flow direction of the water composition, and a unit for releasing a magnetic material following the processing steps.

The present apparatus is further provided with a container for retaining processed magnetic materials downstream of the flow of the magnetic material and with a pressure graduating unit for gradating (changing from) the pressure from a high pressure in the tubular reactor to a low pressure in the magnetic material container.

In addition, (19) the present apparatus is also provided with a plurality of reactors for forming super- or sub-critical water compositions, a unit for continuously feeding super- or sub-critical water into the reaction vessel, a unit for continuously releasing liquid from the tubular reactor, a unit for retaining magnetic materials in the reaction vessel, and a tubing system for interconnecting at least each of the reactors, in which the apparatus is operated such that the plurality of reactors is fed individually downstream-wise by the super- or sub-critical water feeding unit by successively switching the tubing system into the respective reaction vessels.

The reaction vessel of the present apparatus is further provided there within (20) porous partition devices to retain magnetic materials and also to replenish non-oxidizing substance therein and (21) a unit for stirring the magnetic material, (22) which may be applied with the magnetic field, where relevant.

In addition, the present apparatus is preferably constructed such that (23) the tubular reactor is placed tilted from the horizontal configuration, so as to transfer carrier upstream of the flow direction of the liquid, in which the unit for continuously releasing liquid is situated higher than the unit for continuously feeding the critical water composition. (24) The apparatus may be provided further with at least one porous compartment for retaining the carrier which is placed in the tubular reactor to be subjected later to processing for a predetermined period of time and subsequently released. In addition, (25) these process steps may be carried out under an applied magnetic field, where relevant.

In the method described earlier in (1), the process step may be carried out by bringing the carrier in contact with the critical water composition in batches, (26) preferably at least once using water of the total weight of at least twice that of the carrier, (27) preferably once using water of the weight of at least two and a half times that of the carrier, or (28) preferably repeated at least twice using water of the weight of at least one and a half time that of the carrier. In addition, (29) the super-critical conditions are of a temperature of at least 375° C. and a pressure of at least 25 MPa.

As indicated hereinabove, the method for separating materials described in (1) facilitates the separation of a resinous coating material from a magnetic core material in the carrier used in two-component dry developers through process steps in water under super- or sub-critical conditions, in which the separation is achieved by reactions such as hydrolysis and/or pyrolysis in liquid solution.

Process steps in the present method described in (2) are characterized by the conditions of sub- or super-critical water compositions preferably of a temperature of at least 300° C. and a pressure of at least 20 MPa, more preferably at least 350° C. and at least 25 MPa and, which are effective for the materials separation through decomposition. In addition, process steps in the present method described in (3) are characterized by the conditions of super-critical water compositions preferably of a temperature of at least 400° C. and a pressure of at least 22 MPa, which are more effective for the materials separation through decomposition.

These conditions of temperature and pressure also influence water density. The water density is defined herein as the weight of water in unit volume. In order to achieve good removal of the coating, the water density is at least 0.1, preferably at least 0.3, and more preferably at least 0.5. Furthermore, these conditions may preferably be selected depending also on the type of apparatus used. For a continuous type apparatus, for example, relatively high temperatures and pressures are preferred to reduce processing time. By contrast, for a batch type apparatus for which a longer time is generally required for raising the temperature of both materials being processed and water in a reaction vessel, conditions such as those for the sub-critical water with lower temperatures and pressures may be selected, which takes a longer processing time.

In addition, process steps in super critical water may be carried out for a time period preferably ranging from one minute to 90 minutes. This period may vary depending on the properties of resins and the conditions of super-critical water compositions, such as preferably ranging from one minute to 60 minutes, more preferably ranging from two minutes to 30 minutes.

In some cases, process steps may be selected in which materials being processed are retained in a highly pressurized tubular reactor for relatively short time period such as, for example, ranging from two to five minutes. This enables continuous processing in place of batch processing described earlier. In such continuous processing, a water slurry of the carrier may be pressurized in a multi-stage fashion to subsequently lead to the tubular reactor. Following the processing, the resultant products are at reduced pressure preferably at least at two stages and subsequently are subjected to solid-liquid separation.

In the two-component dry developers, the carrier being treated as comprising at least a magnetic core material, as described in (5), coated with cross-linked resinous materials which are difficult dissolve in ordinary solvents. The present method enables good separation of such resinous materials by processing in water under super- or sub-critical conditions.

Further, the present method utilizing super- or sub-critical compositions also enables the separation of resinous coating materials such as the thermosetting resin described in (6), which is difficult to decompose by combustion, and silicone resin described in (7), which is again difficult to decompose by either processing in solvents, acids or alkalis, or by combustion.

Further yet, the present method may be effectively applied to a carrier which includes ferrite as the material for forming the core, described in (8). Since ferrite is relatively stable in water under super- or sub-critical conditions, separation processing of the magnetic core material is achieved without degrading its materials properties. In order to avoid degradation, this processing may be made preferably under non-oxidizing conditions, more preferably under non-reducing as well as non-oxidizing conditions.

The present method for separating the magnetic material using the super- or sub-critical compositions is also accompanied, as described above, by the process steps utilizing pyrolysis and hydrolysis effects for separating magnetic material, and subsequently collecting, rinsing and drying, to be used as a recycled magnetic material for forming carrier.

During process steps for collecting, rinsing and drying the magnetic material, the magnetic material may be sifted successively through at least two screens. That is, after sifted through the first screen having a predetermined mesh, it is examined whether non-separated i.e., resin bearing magnetic particulates be present, or whether particulates having a size exceeding a predetermined value can be found. After subsequent sifting through a second screen having increased mesh, it is examined whether particulates having a size less than a predetermined value are found, which are formed possibly by either abrasion or collision. Undesirable particulates found in these above steps are removed before the following recycling steps.

In the step of recycling, virgin magnetic material can be incorporated into the recycled material. Further, resin monomers recovered from treated solutions can be used efficiently in recycled use.

Also in the present method, as described earlier in (14), the processing steps may be carried out by decreasing with time the amount of materials either decomposed or dissolved in super- or sub-critical water compositions with which the developer is in contact during the processing steps. This results in a more thorough separation of resinous material from the carrier, since the carrier tends to include a relatively large amount of non-decomposed portions of the materials, which generally tends to suppress the reactions for the separation because of a high concentration of the non-decomposed portions. The above consideration also facilitates an increase in heat efficiency for the processing steps. Further, these processing steps may be utilized in practice in a system including a reactor and a plurality of interconnected tubings, as described earlier in (16).

Further yet, as described earlier in (15), process steps may be carried out by transferring the carriers upstream of the flow direction of the water composition. This facilitates good separation of resinous material as the carrier being processed progresses toward the upstream. In addition, immediately after the introduction of the carrier being treated into the reactor, the carrier is brought into contact with water composition already present therein. Since this gives rise to heat exchange between the newly introduced carrier and the water compositions, heat energy in the reactor is efficiently utilized to advance the following separation reactions.

As detailed hereinabove, the apparatus for separating materials described in (17) is provided for two-component dry developers, configured to separate carrier coating materials from core magnetic materials. This apparatus is characterized by including a tubular reactor containing a super- or sub-critical water compositions, a unit for continuously feeding the super- or sub-critical water into the tubular reactor, a unit for continuously disposing liquid and reaction products, a unit for transferring carriers upstream the flow direction of the water composition, and a unit for disposing a magnetic material following the processing steps.

The above unit for continuously feeding the super- or sub-critical water makes use of a pump which may be of the type utilizing difference in either gravitational force or pressure. With the thus prepared unit, the materials processing may be effected in a manner similar to that described in (14).

As described in (18), the present apparatus is further provided, with a container for retaining processed magnetic materials downstream of the flow of the magnetic material and with a pressure graduating unit for graduating a high pressure in the tubular reactor to a lower pressure in the magnetic material container. With the thus prepared unit, processed magnetic materials may be retained in the reaction vessel for a predetermined period of time to be subsequently released after graduating the high pressure and high temperature in the tubular reactor. This facilitates the processed magnetic materials to be released securely even during the operation of the reaction vessel at high pressures and temperatures.

In addition, as described in (19), the present apparatus is also provided with a plurality of reactors for forming super- or sub-critical water compositions, a unit for continuously feeding super- or sub-critical water into the reaction vessel, a unit for continuously releasing liquid from the tubular reactor, a unit for retaining magnetic materials in the tubular reactor, and a tubing system for interconnecting at least each of the reactors in series. This apparatus is operated such that the plurality of reactors is fed individually downstream-wise by the super- or sub-critical water feeding unit by successively switching the tubing system on to the respective reactors.

With the plurality of reactors connected in series in the apparatus, the following steps become feasible: (i) The super- or sub-critical water is fed into the reactor starting from the first reactor in the uppermost stream position, (ii) the materials which are already retained in the first reactor and going to be processed are brought in contact with the water for a predetermined period of time, and (iii) the first reactor is isolated from others for the second reactor to be fed by the water and, at the same time, the processed materials are released from the first reactor. These steps are then carried out for the second reactor and so on, successively. This facilitates the processed magnetic materials to be released securely even during the operation of the plurality of reactors.

As described earlier in (20), the present apparatus is further provided with porous partition devices to retain magnetic materials and also to replenish non-oxidizing substance therein together with the carrier.

With the thus prepared devices, the magnetic materials are retained securely in the porous partition devices. This is especially effective for particulate materials to obviate nonuniform processing. The nonuniform processing may be caused by the layer structure of the particulates, in that, due to a nonuniform contact with super-critical water, for example, the processing may be made in nonuniform manner over the portions in the reactor. With the present porous partition devices, therefore, more reliable materials separation can be achieved.

Furthermore, the apparatus is provided further with a unit for stirring the magnetic material, as described in (21). With the stirring unit, the processing of the magnetic particulates is achieved uniformly over the entire reactor, to thereby avoid nonuniform processing caused by the layer structure of the particulates. Also, by stirring the materials within the reactor with the stirring unit, so called short path of the particulates, which may be caused the passage of the super- or sub-critical water, can be avoided hereby again helping avoid nonuniform processing caused by the particulate layer. Furthermore, since either decomposed or dissolved materials can be separated from the surface of the magnetic material by the stirring, more reliable separation becomes feasible.

In addition, as described in (22), a magnetic field may be applied to the reactor, where relevant, as the above noted stirring means. This is advantageous over the mechanical stirring, since magnetic field stirring does not need devices such as, for example, a pressure seal, which are used when an external force is conveyed mechanically to inside of the reactor. By stirring with the magnetic field, the processing of the magnetic particulates is achieved uniformly over the entire portions in the reactor, and a so called short path of the particulates, that may be caused through passage of the super- or sub-critical water, can be avoided. As a result, nonuniform processing caused by the particulate layer can be avoided.

Since the magnetic materials in the present disclosure are generally characterized by relatively low values of residual magnetic moment, no appreciable undesirable effects caused by applied magnetic field are expected on the properties of the magnetic materials.

As described earlier in (23), the present apparatus is provided with a tubular reactor, which is placed tilted from the horizontal configuration, so that the carrier be transferred upstream the flow direction of the liquid, in which the unit for continuously releasing liquid is situated higher than the unit for continuously feeding the critical water composition.

With this configuration, not only are the carrier particles transferred within the tubular reactor with relative ease, but also processing is effected homogeneously because of the transfer, to thereby achieve reliable separation of the carrier material. In addition, undesirable impurities can be removed from the wall surface of the tubular reactor along the flow of the carrier particles, thereby helping maintain proper conditions for operating the apparatus.

Furthermore, as described in (24), the apparatus is provided further with at least one porous compartment for retaining the carrier which is placed in the tubular reactor to be later subjected to the process for a predetermined period of time, and released afterwards. The carrier particles are therefore transferred while retained in the porous compartment.

With the method of transfer using the porous compartment, several difficulties may be effectively obviated such as, for example, clogging in the reactor tubing and/or stagnant particle flow in constricted portions, caused by the magnetofluid composed of the above magnetic material particulates. As a result, failures of pressurization or pressure control unit may be effectively alleviated.

In addition, these structures incorporating the porous compartment may further be operated under the applied magnetic field. Namely, as described in (24), the apparatus which is provided further with at least one porous compartment for retaining the carrier may be operated more effectively under the magnetic field, in order to supply, retain for a predetermined period of time, and subsequently release magnetic materials. As a result, the transfer of the magnetic particulates within the reactor is achieved uniformly without the use of mechanical devices accompanied by, for example, a pressure seal, which are used when an external force is conveyed mechanically into the reactor.

Furthermore, with the thus prepared apparatus, processing steps for separating materials disclosed herein are carried out by bringing the carrier in contact with the critical water composition by batch, preferably at least once, as described in (26). This process step is characterized by using water of the total weight of at least twice that of the carrier, whereby reliable separation is achieved.

Alternatively, similar process steps may be carried out, as described in (27), by bringing the carrier in contact once using water of the weight of at least two and a half times that of the carrier, whereby good separation is achieved even after one batch contact.

Alternatively yet, similar process steps may further be carried out, as described in (28), by bringing the carrier in contact twice using water of the weight per contact of at least one and a half time that of the carrier, whereby good separation is achieved after two batch contacts.

It should be noted that these steps of bringing the carrier in contact with the critical water composition by batch are carried out in water composition under the supercritical conditions of a temperature of at least 375° C. and a pressure of at least 25 MPa.

The type of material composites is now described regarding the carrier for forming the developer. The composites disclosed herein include a magnetic material and resinous material, and the type thereof is broadly divided into two groups: One includes several layers of resinous materials, as the major ingeredient, formed on the surface of magnetic particles having relatively large size; the other includes magnetic particles with a relatively small size uniformly dispersed in the resinous materials. The method of separation disclosed herein can be applied to either of these structures.

The magnetic materials incorporated into the carrier include those previously known in the field. Illustrative, non-limiting, examples of the magnetic materials include ferromagnetic materials such as iron, cobalt and nickel; and alloys such as magnetite, hematite and ferrite. Minute particles of these materials are incorporated into the composites with the resinous materials. The average diameter of the magnetic particle ranges from about 10 microns to about 100 microns.

Since the supercritical conditions in water may induce either oxidation or hydrolysis reaction, the magnetic materials are preferably stable under these conditions. In this respect, metal oxide magnetic materials are preferred and either ferrite or magnetite may therefore preferably be selected among others.

In addition, it may be noted, even for the materials which may otherwise be affected with relative ease under the super- or sub-critical water conditions, difficulties due to such reactions may be obviated by appropriately selecting the conditions such as temperature, pressure, processing period and/or additive, depending on the incorporated resinous materials.

Resins for use in forming a coating layer of carriers in the present invention may also be selected from those previously known in the field.

Illustrative, non-limiting, examples of the carrier coating resins include: polyolefin resins such as polyethylene, polypropylene, chlorinated polyethylene, and chlorosulfonated polyethylene; polyvinyl or polyvinylidene resins such as polystyrene, acrylic resin like polymethylmethacylate, polyacrylonitrile, polyvinylacetate, polyvinylalcohol, polyvinylbutyral, polyvinylchloride, polyvinylcarbazole, polyvinylether, and polyvinylketone; vinylchloride-vinylacetate copolymer; silicone resins having organosiloxane bonds and denatured products thereof such as alkyd resin, polyester resin, epoxy resin, and polyurethane; fluororesins such as polytetrafluoroethylene, polyvinyl fluoride, polyvinylidene fluoride, and polychlorofluoroethylene; amino resins such as polyamide, polyester, polyurethane, polycarbonate, and urea-formaldehyde resin; and epoxy resins.

Of the resinous materials, those for use in alleviating the toner spent include, but are not limited to, silicone resins and denatured products thereof, and fluororesins. In particular, the former materials are preferably used.

Silicone resins for use in the present invention may be selected from those previously known in the field. Specific, non-limiting, examples of the silicone resins include straight silicones, having only organosiloxane bonds, exemplified by the formula (I) shown hereinbelow; and the products of the silicone resins denatured by alkyd, polyester, epoxy or urethane.

(I)

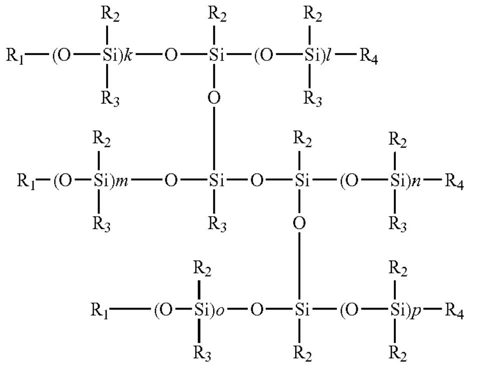

where $R_1$ is hydrogen, $C_1$~$C_4$ alkyl or $C_1$~$C_4$ phenyl; $R_2$ or $R_3$ is hydrogen, $C_1$~$C_4$ alkoxy, pheny or phenoxy, $C_2$~$C_4$ alkenyl, $C_2$~$C_4$ alkenyloxy, hydroxyl, carboxyl, ethylene oxide, glycidyl, or the group represented by the following formula;

(II)

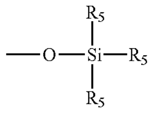

33 where $R_4$ or $R_5$ is hydroxyl, carboxyl, $C_1$~$C_4$ alkyl, $C_1$~$C_4$ alkoxy, $C_2$~$C_4$ alkenyl, $C_2$~$C_4$ alkenyoxy, pheny or phenoxy, with k, l, m, n, o and p each being an integral number of at least one.

The above noted substituents may either be non-substituted or substituted by a group such as amino, hydroxyl, carboxyl, mercapto, alkyl, phenyl, ethylene oxide, or glycidyl; or halogen.

Further, the resinous material may be combined with a cross-linking agent to be cross-linked by, for example, heating process steps. A coated layer formed of such a thermally cross-linked resinous material is generally insoluble in solvent, acid or base. Also, materials which are formed during the heating steps, such as carbonized materials, for example, may adhere on the surface of core magnetic materials. Therefore, it becomes feasible in the present disclosure to achieve good separation of the resinous coating material from the magnetic material, which is otherwise difficult to accomplish.

Of these thermally cross-linked materials, coating layers of silicone reins are quite difficult to remove, since they are stable in various acids and bases, insoluble in solvents, and hard to decompose even by burning.

Since the separation of the resin coating from magnetic materials are thus difficult to achieve for material system such as mentioned above, methods of separation utilizing water under either super- or sub-critical conditions are, therefore, considered effective.

Silicone resins used in the present disclosure may be selected from those previously known in the field. Specific examples of the silicone resins include, but are not limited to, those resins commercially available from Shiners Silicon Co, such as KR261, KR271, KR272, KR275, KR280, KR282, KR285, KR251, KR155, KR220, KR201, KR204, KR205, KR206, SA-4, ES-1001, ES1001N, ES-1002T, and KR3063; and resins from Toray-Dow Corning Co, such as SR2100, SR2101, SR2107, SR2110, SR2108, SR2109, SR2115, SR2400, SR2410, SR2411, SH805, SH806A and SH840.

Carriers used in this disclosure may preferably be dispersed with electrically conductive materials to control volume conductivity thereof. These conductive materials may be selected from those previously known in the field, including but not limited to metals such as iron, gold and copper; iron oxides such as ferrite and magnetite, and pigment such as carbon black.

Of these materials, furnace black and acetylene black are preferably used in particular, since the conductivity become appropriately controlled by adding a small amount of minute particles thereof. In addition, an excellent abrasion resistance can also be achieved by including these materials in the carrier.

The above noted minute particles of the conductive materials are preferably included in carriers, having a diameter ranging from about 0.01 micron to about 10 microns, in an amount of ranging from 2 parts by weight to 30 parts by weight, more preferably from 5 parts by weight to 20 parts by weight, per 100 parts by weight of the coasting resin. It may be noted that materials such as, for example, the above conductive particles included in the coating resin material have been found to give rise to no significant adverse influence on materials processing of the present invention.

In addition, silane coupling agents or titanium coupling agents may be included further in the coating resin layer to improve the adhesion between core materials themselves and dispersibility of the conductive materials.

The silane coupling agents for use in the present invention are expressed by the following general formula:

$$YRSiX_3 \qquad (III),$$

where $X_3$ is a hydrolytic group, which is bonded to Si atom, such as chlor, alkoxy, acetoxy, alkylamino and propenoxy group; Y is an organic functional group which reacts on organic matrix, such as vinyl, methacrylic, epoxy, glycidoxy, amino and mercapto group; and R is $C_1$~$C_{20}$ alkyl or $C_1$~$C_{20}$ alkylene.

Of these silane coupling agents, amino group is preferred as the group Y in the coupling agent to achieve negative charging, while epoxy group is preferred again as the group Y to achieve positive charging.

Carrier particles in this disclosure are recovered from a copying apparatus as a developer used in copying process steps, which are an admixture of carrier and toner particles. Although this mixture may be subjected to supercritical processing as they are, the toners are preferably separated from the carriers prior to the supercritical processing, since the former can be separated with relative ease. For this separation, a method is utilized such as, for example, the blowing-off method.

In contrast, since spent toners incorporated into carriers are difficult to separate by the above method, they may be subjected to pretreatment steps prior to the supercritical processing, in which cleaning with solvents possibly with heating can be carried out, for example. This incorporation of spent toners, however, does not have a substantial adverse effect on the separation steps of magnetic materials from resinous materials, since the separation can adequately be carried out, in general, even with some toner particles included.

Supercritical and subcritical water compositions for use in the carrier processing in the present disclosure are appropriately prepared under the conditions of at least a pressure ranging from 2.5 MPa to 90 MPa at a temperature ranging from 200° C. to 800° C. The conditions are preferably a pressure of from 5 MPa to 50 MPa at a temperature of from 250° C. to 450° C.

Within the above range, specific processing conditions are preferably selected depending on the composition presently utilized for resins and magnetic materials. For example, conditions are preferably selected so as to decompose coating resin with relative ease and not to cause appreciable degradation in quality of magnetic materials. In addition, since the processing time can be reduced with increase in the pressure and temperature, both may preferably be selected as high as possible. For example, the range of such preferable conditions may be achieved with a pressure greater than 22 MPa at a temperature higher than 400° C.

In the above process steps of the separation, it may also be sufficient for the coating resin to be partially removed. Namely, when carrier deterioration is generally limited to the surface region or the vicinity thereof, the removal of the resin in that portion may be sufficient to restore the desirable carrier property.

In addition, since the supercritical or subcritical resin decomposition is initiated at the surface region, then proceeds toward inside of the carrier particles, the extent of the decomposition can be controlled by, for example, the decomposition time. Further, the rate of resin removal preferably ranges from at least 50%, more preferably at lest 80%, most preferably at least 90%, of the amount of resin prior to the removal. This higher rate of resin removal is preferred for the reasons related to succeeding process steps in which treated core materials are incorporated into virgin core materials. In these process steps, a higher stability can be achieved with treated core materials having a higher removal rate, since a difference in core material composition may influence the property of a restored developer material.

That is, treated core materials with a high removal rate would not require consideration for carrying out process steps in addition to those for virgin core materials and the former materials can be processed in similar manner as the latter.

Following resin removal, magnetic materials previously used in the carrier can be recovered through several process steps, such as cleaning adhered undesirable substance, and then dried. The magnetic materials can thus be recovered to subsequently be used for coating.

The cleaning steps of the magnetic materials and removing steps of adhered materials are not limited to those described above. For example, mechanical friction may also be applied to the surface of core materials during stirring, thereby assisting in the removal of the adhered material. Furthermore, ultrasonic cleaning may also be utilized during the process steps.

Turning now to FIGS. 12A through 16, an apparatus for separating materials disclosed herein will be detailed hereinbelow. Legends in these figures are as follows: A reaction vessel 1, the direction of the flow of super- or sub-critical water 2, the direction of carrier transfer 3, a tubular reactor 4, a means for feeding super- or sub-critical water 5, means for releasing super- or sub-critical water and reaction products 6, means for supplying carrier 7, means for releasing magnetic material 8, means for transferring carrier 9, the direction of feeding super- or sub-critical water 10, the direction of releasing super- or sub-critical water and reaction products 11, the direction of feeding carrier 12, the direction of releasing magnetic material 13, means for degradating (changing from) pressure 14, a container for magnetic material 15, first reaction vessel 16, second reaction vessel 17, n-th reaction vessel 18, means for feeding super- or sub-critical water 19, means for releasing liquid material 20, a tubing system for interconnecting reactors 21, a porous partition device 22, first means for retaining 23, a tubular reactor 24, a supplying unit 25, a releasing unit 26, supplied super- or sub-critical water 27 and released liquid 28.

Figure 12A:
FIG. 12A is a flow diagram illustrating steps to achieve materials separation with apparatus according to one embodiment disclosed herein, in which a reaction vessel is shown together with the directions of the flow of super- or sub-critical water and of carrier transfer.
Figure 12B:
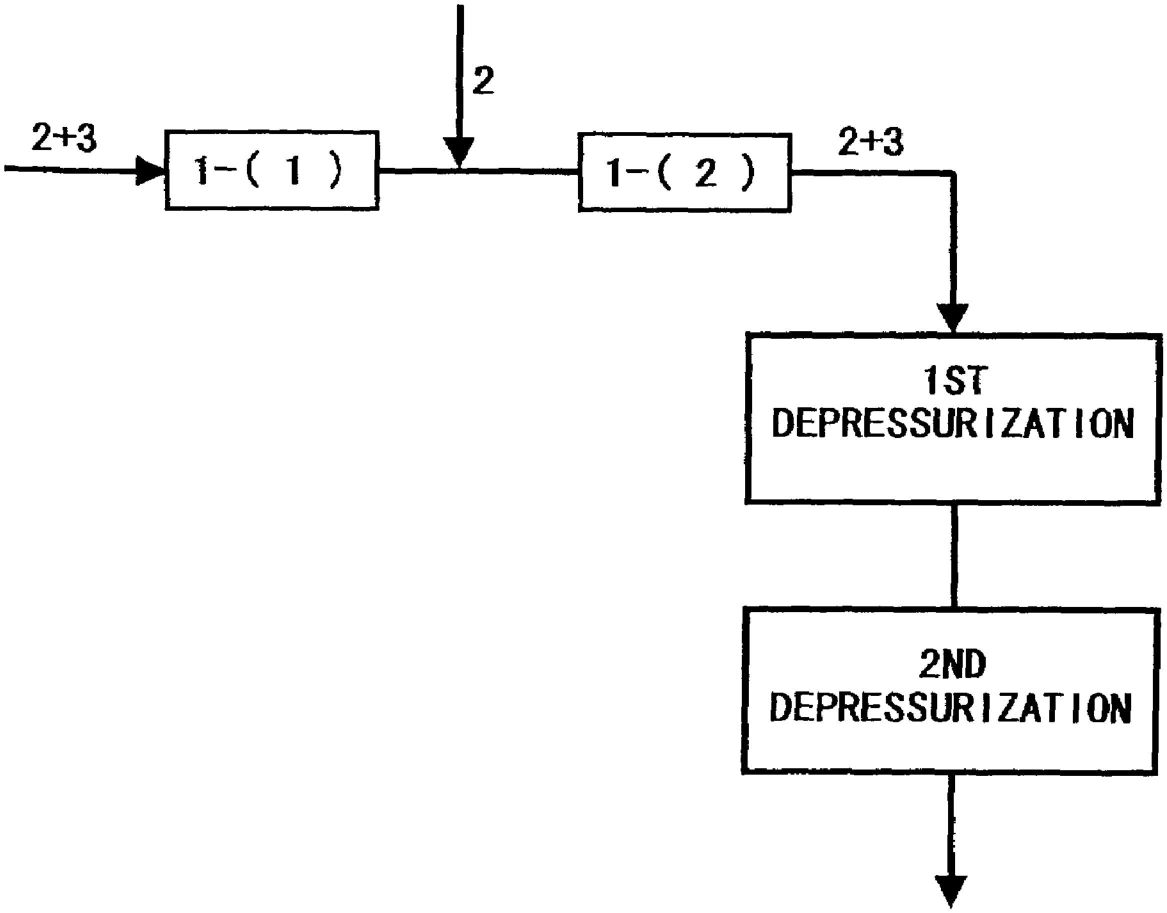
FIG. 12B is a flow diagram illustrating steps to achieve materials separation with apparatus according to another embodiment disclosed herein, in which multi-staged reactors are shown, which are each supplied with super- or sub-critical water 2.

Referring to FIG. 12A, a reaction vessel 1 is illustrated together with the directions 2 and 3 of the flow of super- or sub-critical water and of carrier transfer, respectively, according to one aspect of the present disclosure. Illustrated in FIG. 12B are multi-staged reactors 1-1 and 1-2, which are each supplied with super- or sub-critical water 2. The materials released from rector 1-2 flow successively through a first and a second depressurization stages before release.

As described earlier, an apparatus for separating materials disclosed herein is configured to separate carrier coating materials from core magnetic materials. This apparatus includes, as described in (17), a tubular reactor 4 (FIG. 13) containing a super- or sub-critical water composition, a unit 5 for continuously feeding the super- or sub-critical water composition, a unit 6 for continuously releasing liquid and reaction products, a unit 9 for transferring carriers upstream the flow direction of the water composition, and a unit 8 for releasing a magnetic material following the processing steps.

Figure 13:
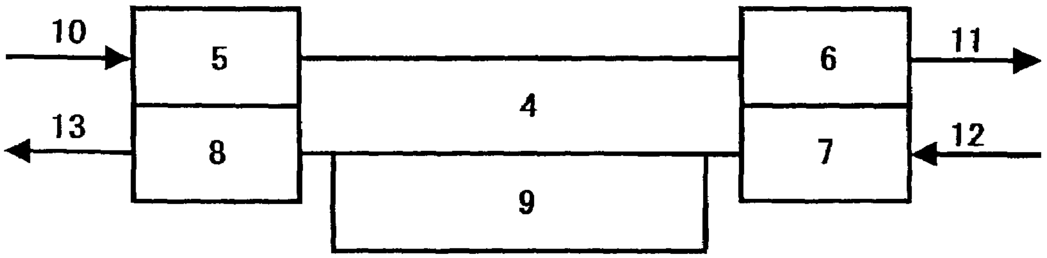
FIG. 13 is a flow diagram illustrating steps to achieve materials separation with apparatus according to still another embodiment disclosed herein.

FIG. 13 is a flow diagram illustrating the steps to achieve materials separation with the apparatus according to one embodiment disclosed herein.

Referring to FIG. 13, super- or sub-critical water is fed by a unit 5 for feeding super- or sub-critical water into a tubular reactor 4 which produces super- or sub-critical water compositions. In addition, electrophotographic developers including carrier are supplied thorough a supplying unit 7. The super- or sub-critical water in the reaction vessel 4 acts on the developers, to thereby result in reaction products of resinous material previously incorporated into the carrier. Being admixed with the super- or sub-critical water in releasing unit 6, the resultant water compositions thus formed are subsequently released as flow 11. After being separated from the resinous material, the magnetic materials included previously in the carrier are now transferred upstream the flow direction of the water composition by the transfer unit 9 together with liquid compositions, to subsequently be released thorough the unit 8 as magnetic materials flow 13.

In the tubular reactor, a carrier newly fed into the reactor in the downstream portion thereof is included in the liquid composition comprising decomposed or dissolved resinous material in water composition, that is previously formed in the upstream portion of the reactor. This helps preheat the newly fed carrier, to thereby facilitate the following decomposition steps.

The present composition in the downstream portion is subsequently transferred upstream of the reactor by the transfer unit 9. Since the concentration of either decomposed or dissolved resinous material in the upstream portion is less (in the super- or sub-critical liquid), effective separation of the resinous material from carrier is achieved more easily in this portion of the reactor.

In order to achieve good separation, the super- or sub-critical water in the reactor is preferably under the conditions of a temperature of at least 374.2° C. and a pressure of at least 21.8 MPa, more preferably a temperature of at least 400° C. and a pressure of at least 30 MPa.

In addition, during the separation process steps, the time period of retaining the carrier in the reactor preferably ranges from one minute to 5 minutes, and is appropriately selected depending on the properties of resins and the conditions of super-critical water compositions.

Figure 14:
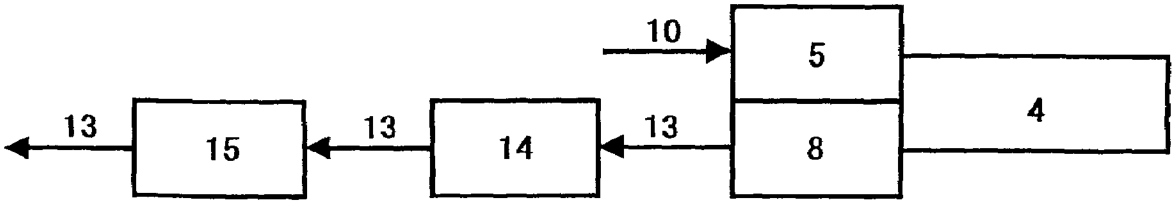
FIG. 14 is a flow diagram illustrating steps to achieve materials separation with apparatus according to another embodiment disclosed herein.

FIG. 14 is a flow diagram illustrating the steps to achieve materials separation with the apparatus according to another embodiment disclosed herein.

Referring to FIG. 14, the magnetic materials released thorough the unit 8 are subsequently held in the unit 15 for retaining magnetic material, while the pressure degradating unit 14 is kept open to allow the passage of the magnetic material. After a predetermined amount of the magnetic material is retained, the magnetic material is released through the container 15, while the pressure between the tubular reactor 4 and the container 15 is degradated by the pressure degradating unit 14. These steps facilitate the release of processed magnetic materials even during the operation of the reaction vessel at high pressures and high temperatures, which is advantageous for efficient turnaround of operation with reduced startup times and downtimes.

Figure 15A:
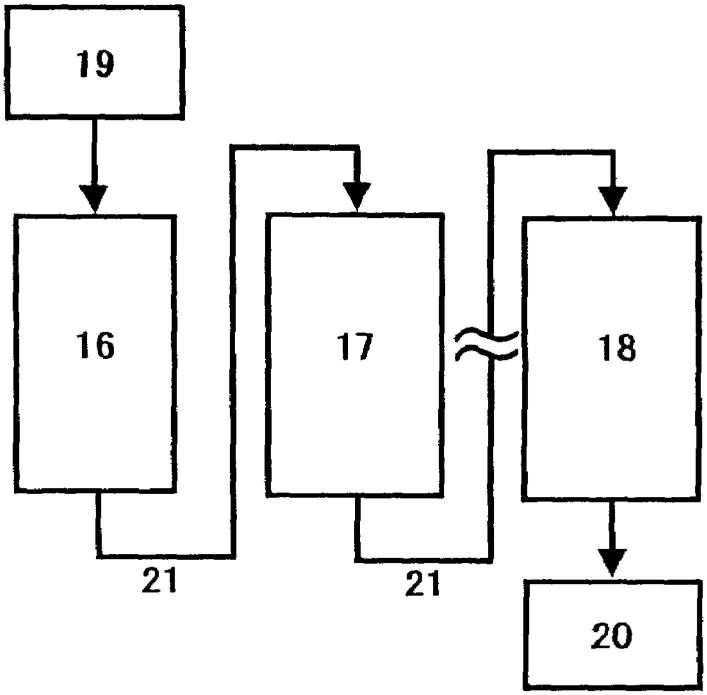
FIG. 15A is a flow diagram illustrating steps to achieve materials separation with apparatus according to another embodiment disclosed herein, in which super- or sub-critical water is supplied to a first reactor.
Figure 15B:
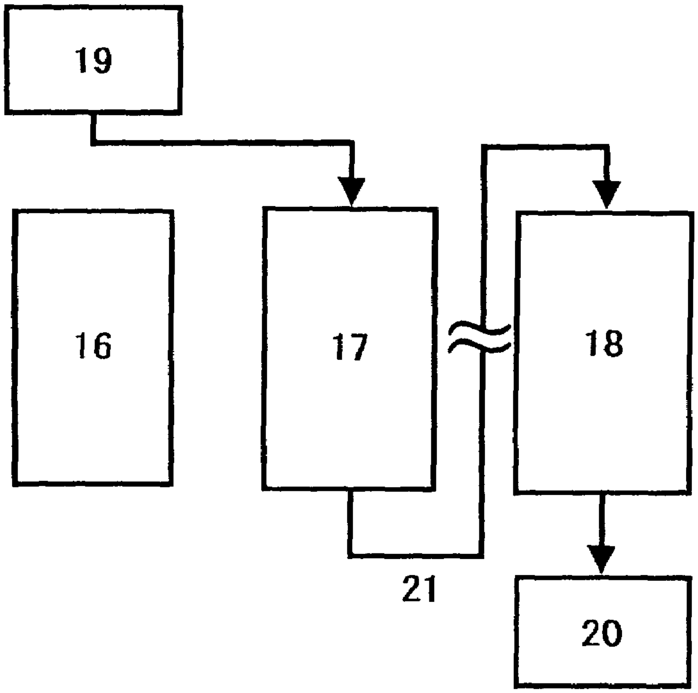
FIG. 15B is a flow diagram illustrating steps to achieve materials separation with apparatus according to another embodiment disclosed herein, in which super- or sub-critical water is supplied to a second reactor.

FIGS. 15A and 15B are flow diagrams illustrating steps to achieve materials separation with the apparatus according to yet another embodiment, described also earlier in (19), in which the apparatus is operated such that a plurality of reactors are each fed individually downstream-wise by the super- or sub-critical water feeding unit by successively switching the tubing system on to the respective reactors.

Referring to FIG. 15A, the plurality of reactors 16 through 18, for example, are provided with carriers contained therein. Super- or sub-critical water which is supplied first into the reactor 16 decomposes or dissolves the resinous material in the carrier during the passage through the reactor 16.

The resultant products are then transferred to the reactor 17, in which the carrier already contained in the reactor 17 is decomposed to some degree. The reactor 17 typically already contains either decomposed or dissolved resinous material previously transferred from the reactor 16. The currently transferred composition into the reactor 17 helps heat the content of the reactor 17, to thereby facilitates the following decomposition steps.

When the super- or sub-critical water flows through from the feeding unit 19 to releasing unit 20 and the resinous material is sufficiently separated from the carrier in the reactor 16, the interconnecting tubing 21 between the reactor 16 and the reactor 17 is closed, and the reactor 16 is isolated by disconnecting the feeding unit 19. Subsequently, super- or sub-critical water is now supplied to the reactor 17 (FIG. 15B).

With these process steps, super-critical water including almost none of the above-mentioned decomposed products is supplied to the reactor 17, to thereby lead to good separation of resinous material included in the carrier which is retained in the reactor 17.

In addition, from the reactor 16 which has been isolated from both the reactor 17 and the feeding unit 19, processed magnetic materials are taken out and fresh carrier can subsequently be supplied to be processed later.

Although the number of the reactors to be connected in series varies depending on the capacity of the reactor and the amount of the super-critical water to be fed, it preferably ranges from two to five.

In addition, porous partition devices may be provided in the reactor to effectively retain the carrier therein. In particular, when filters are included in the reactor besides the carrier, the so called short path which is caused for liquid flow through particulates without reactive interactions may be prevented. The filters are preferably composed of non-oxidizing substance having a size larger than that of the particulates.

The short path is also prevented by stirring the layer of particulates. A magnetic field may preferably be utilized in stirring, since it does not require the use of several devices used in mechanical stirring, for example, a pressure seal used when an external force is conveyed mechanically to inside of the reactor.

Figure 16:
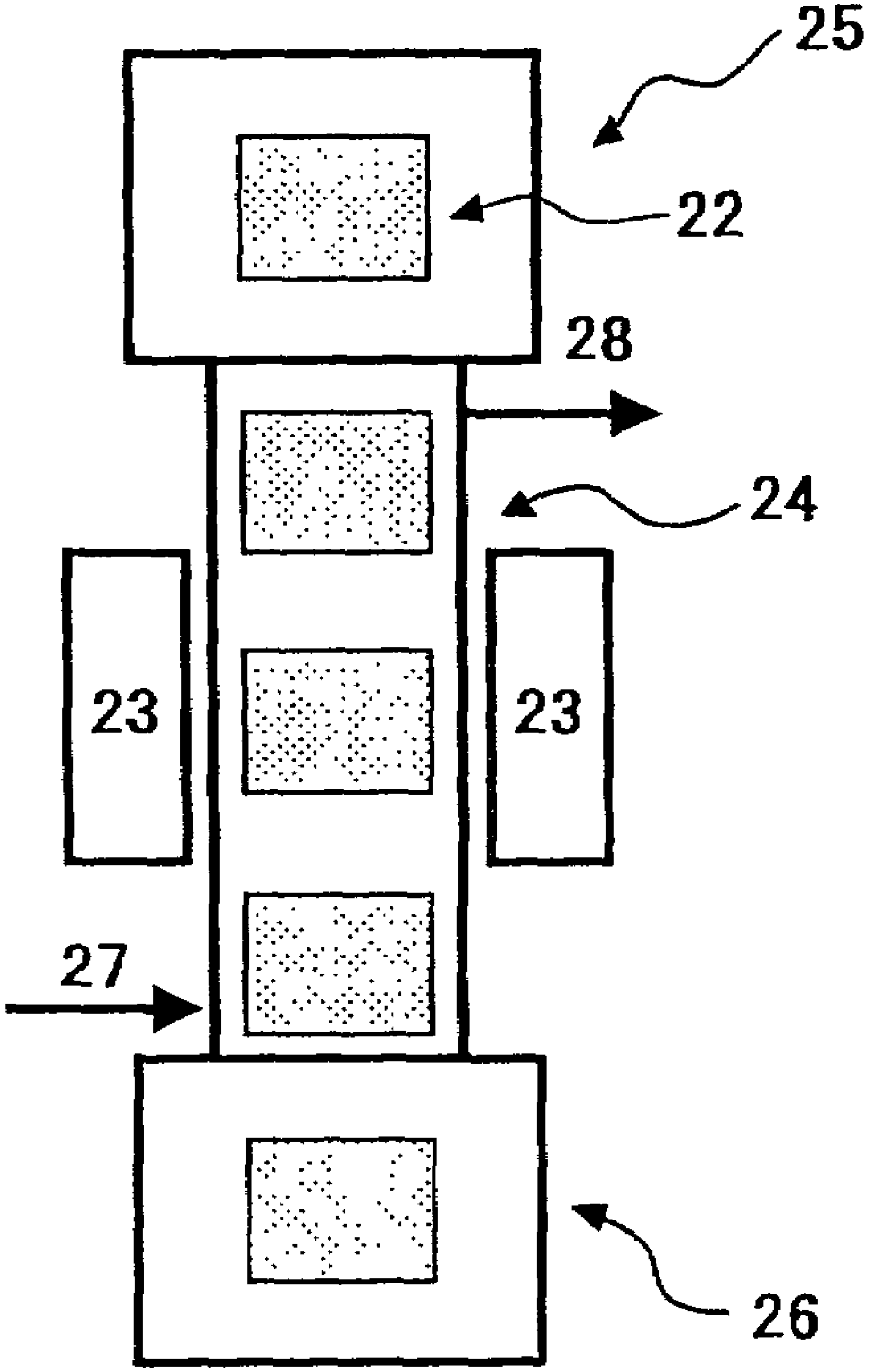
FIG. 16 is a flow diagram illustrating steps to achieve materials separation with apparatus according to an embodiment disclosed herein.

FIG. 16 is a flow diagram illustrating steps to achieve materials separation with the apparatus according to another embodiment, described also earlier in (24), in which the apparatus may be provided further with at least one porous compartment for retaining the carrier which is placed in the tubular reactor to be subjected to processing later for a predetermined period of time and subsequently released.

Referring to FIG. 16, super- or sub-critical water is fed through a tubing 27 into a tubular reactor 24 and later released through another tubing 28. A plurality of porous compartments for retaining the carrier are brought into the reaction vessel 24 through a supplying unit 25. Each of the compartments is then transferred upstream within the reactor, where the concentration of either decomposed or dissolved resinous material in the super- or sub-critical liquid composition decreases. This transfer is carried out utilizing a difference in either the gravitational force or pressure.

Good separation of the resinous material from carrier is thus achieved. In order to retain the porous compartment for a sufficiently long period of time, a means for retaining 23 is further provided, in which a magnetic field may preferably be utilized as a retaining means.

With the use of the porous compartment for retaining the carrier in the reactor, difficulties such as, for example, possible inflow of carrier particulates into valve portions can be prevented. As a result, the reliability of the separation processes and the apparatus used increases. In addition, since sufficient reaction periods are provided by temporarily retaining the compartments in the reactor, for a selected period of time, a good separation of the resinous materials can be achieved, and the size of the tubular reactor may be reduced as compared with not using such porous compartments in a reactor.

Having generally described the present disclosure, the following examples are provided further to illustrate preferred embodiments. This is intended to be illustrative but not to be limiting to the materials, processes or apparatuses described herein. In the description of the following examples, numerals are parts by weight unless otherwise indicated.

EXAMPLES

Example 1

A carrier for composing an electrophotographic developer was fabricated in accordance with steps and apparatus which follow.

(Carrier Formation)

A mixture of the following components was prepared to obtain a coating composition for forming a carrier.

| | |
|---|---|
| Silicone resin (SR2400, from Toray-Dow Corning) | 50 parts |
| Toluene | 150 parts |
| Carbon black (#44, from Mitsui Chemical) | 2 parts |

The thus prepared composition was coated on the surface of spherical magnetite particles amounting to 1000 parts, each having an average diameter of about 80 microns, whereby carrier particles A were formed.

The carrier particles A of 97 parts were then admixed with commercially available toners (Type 7 for Ricoh Imagio) of 25 parts, to thereby form a developer A.

The thus prepared developer A was used in 300,000 copying operations, using a Ricoh digital copy apparatus commercially available as the IMAGIO MF4550®. Subsequently, the developer A was taken out from the copy apparatus, and treated and examined as follows: Toner particles were separated electrostatically from the carrier by the blow-off method to be hereinafter referred to as treated sample A, in which the amount of residual toner particles on the carrier surface, or the toner-spent amount, was found minimal.

(Treatment in Supercritical Water)

Into an autoclave made of stainless steel 316 (content volume of 6 ml), 3 grams of hydrogen peroxide aqueous solution (3% by weight) was placed. Subsequently, the autoclave was sealed and allowed to stand in a 350° C. floating sand bath for 15 minutes for an oxide film to be formed on the inner surface of the autoclave. The thus prepared autoclave was used as a reaction vessel.

The following composition was prepared and poured into the reaction vessel.

| | |
|---|---|
| Treated sample A | 0.4 part |
| Water | 1.0 part |

The reaction vessel was subsequently pressurized with nitrogen to a pressure of 1 MPa to be left for 1 minute, then the pressure was reduced to atmospheric pressure gradually over a period of 30 seconds. This pressurization and decompression steps with nitrogen were repeated three times before sealing the reaction vessel filled with nitrogen. After placing the reaction vessel in a 400° C. floating sand bath to reach an inside pressure of 25 MPa and a temperature of 400° C., then allowing to stand for 1 hour, the vessel was removed from the sand bath to be cooled by immersing into a water bath at normal temperature.

The reaction vessel was opened and the reaction products were taken out and admitted into a glass vessel. When the products in the glass plate were observed, black particles were found being deposited, having a relatively large diameter, which were found to be magnetite particles; while minute black particles were suspended and were found to be carbon black particles. In addition, some oily products were also found adhered to the glass wall. The above noted black particles were then collected and dried in a constant-temperature drying oven at 100° C. for 1 hour, whereby an evaluation sample A was obtained.

(Evaluation of the Degree of Separation Between Magnetic Materials and Coating Resin)

The evaluation sample A was vacuum evaporated with platinum and observed with a Hitachi scanning electron microscope Model S-2400 under the conditions of an acceleration voltage of 15 kV and 800 magnification. The results from the electron microscope observation indicated that almost all silicone coating resin had been removed from the surface of the sample A with the exception that a small amount of impurities were present at several locations.

In addition, the elemental composition on the surface of the evaluation sample A was also analyzed with a Horiba x-ray microanalyzer Model EMAX2700. The amount of Si element detected by the microanalyzer on either the evaluation sample A or the carrier particle A was respectively measured, to thereby calculate the rate of silicone resin removal as follows;

Removal rate=[(Detected Si amount on carrier particle A)−(Detected Si amount on evaluation sample A)] % (Si amount detected on carrier particle A)

The result of the removal rate was obtained to be 80%. Further, when the magnetic characteristics of the evaluation sample A were measured, they were found to be comparable with those of the carrier core materials.

Example 2

A further evaluation sample B was formed in a manner similar to Example 1, with the exception that the supercritical treatments were carried out for the following composition different from that of Example 1.

| | |
|---|---|
| Treated sample B | 0.4 part |
| Water | 2.85 parts |

For this composition, the conditions inside the reaction vessel reached a pressure of 35 MPa at 400° C.

Figure 2:
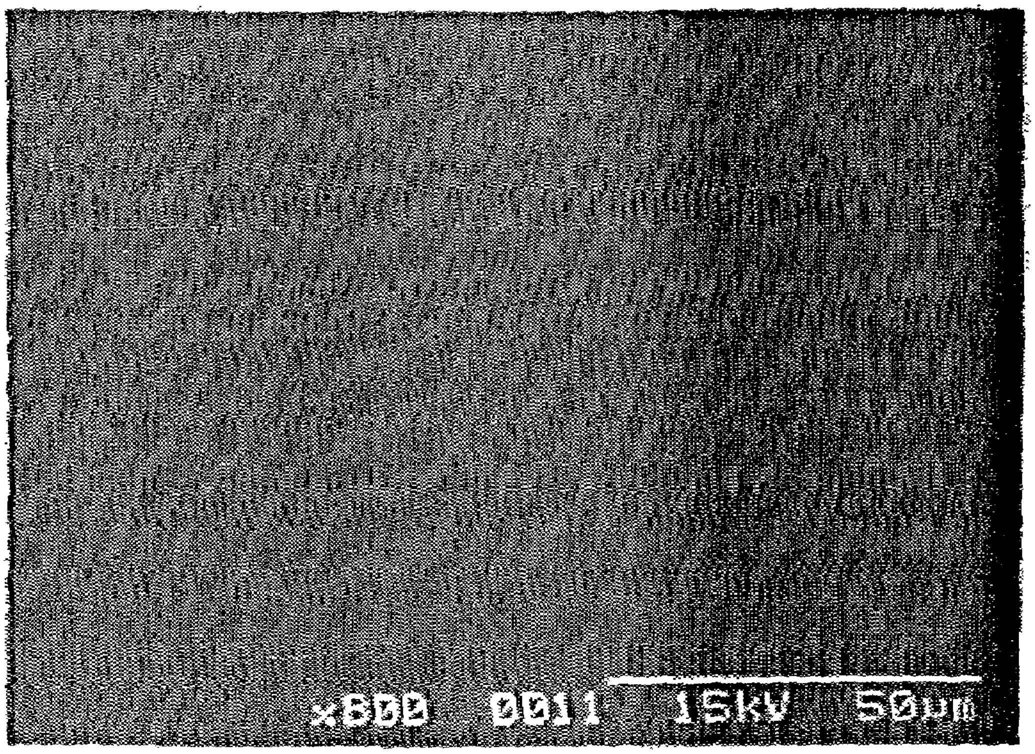
FIG. 2 is a Si mapping image by EPMA (electron probe microanalyzer) of the sample of Example 2.

The results obtained from an electron microscope photograph (FIG. 1) indicated that almost all silicone coating resin had been removed from the surface of the sample B and the removal rate for the sample was found as 95%. Further, when the magnetic characteristics of the evacuation sample B was measured, they were found to be comparable with those of the carrier core materials prior to copying operations. A Si mapping image with EPMA for the sample B was obtained as shown in FIG. 2.

Example 3

A treated sample was obtained in a similar manner to the treated sample A of example 1 and processed under similar supercritical conditions to those of Example 1. The treated sample was subsequently removed from the reaction vessel and admitted into a beaker, then supernatant liquid thereof was removed. After 100 ml of distilled water was added to the thus treated sample and the resulting material was placed in an ultrasonic washer for 5 minutes, only deposits thereof were collected, then dried in a similar manner to Example 1, whereby evaluation sample C was obtained.

Results from scanning electron microscope observation for the evaluation sample C indicated that almost all silicone coating resin had been removed from the surface of the particles as observed in the evaluation sample A. In addition, the results also indicated, in contrast to Example 1, that the small amount of impurities previously observed in the sample A was nearly absent from the present sample.

The magnetic characteristics of the evacuation sample C were measured and found comparable with those of the carrier core materials.

Example 4

A further treated sample was obtained in a similar manner to the treated sample A of example 2 and processed under similar supercritical conditions to those of Example 2. The treated sample was subsequently removed from the reaction vessel and admitted into a beaker, then supernatant liquid thereof was removed. After thus treated sample in the beaker was augmented with 100 ml of distilled water and placed in an ultrasonic washer for 5 minutes, only deposits thereof were collected, then dried in a similar manner to Example 1, whereby evaluation sample D was obtained.

Results from scanning electron microscope observation for this sample D indicated that almost all silicone coating resin had been removed from the surface of the particles, as previously observed in the evaluation sample B. In addition, the results also indicated, in contrast to Example 1, that the small amount of impurities previously observed were nearly absent from the present sample.

The magnetic characteristics of the evacuation sample D were measured and found comparable with those of the carrier core materials.

Comparative Example 1

Figure 3:
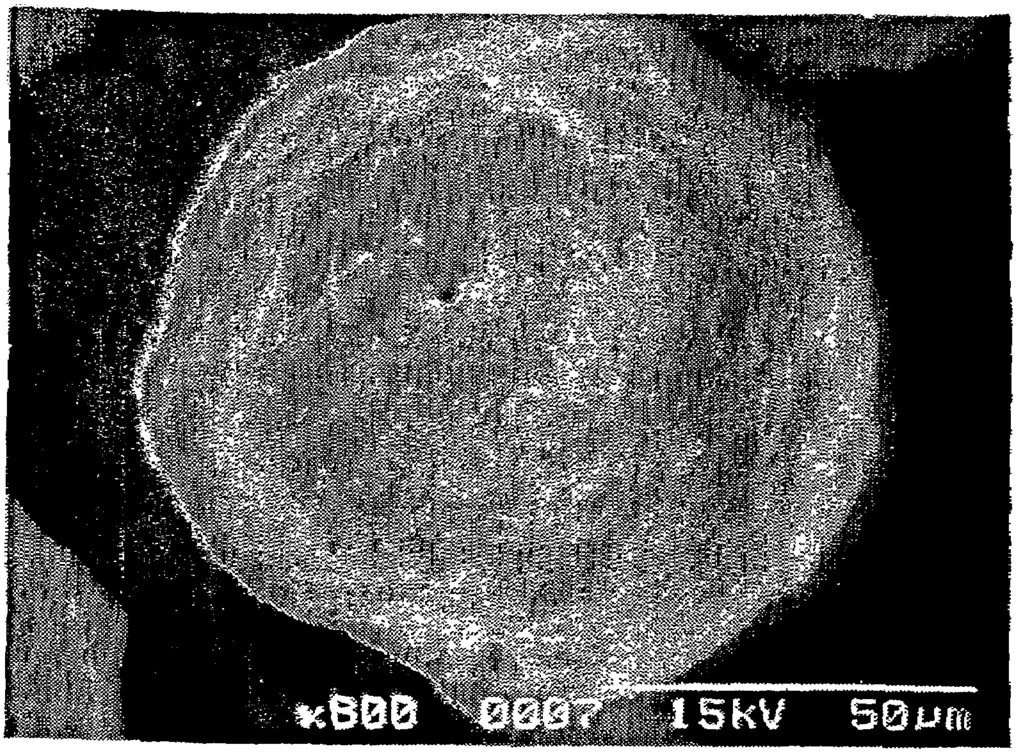
FIG. 3 is a scanning electron microscope photograph of the sample of Comparative Example 1.
Figure 4:
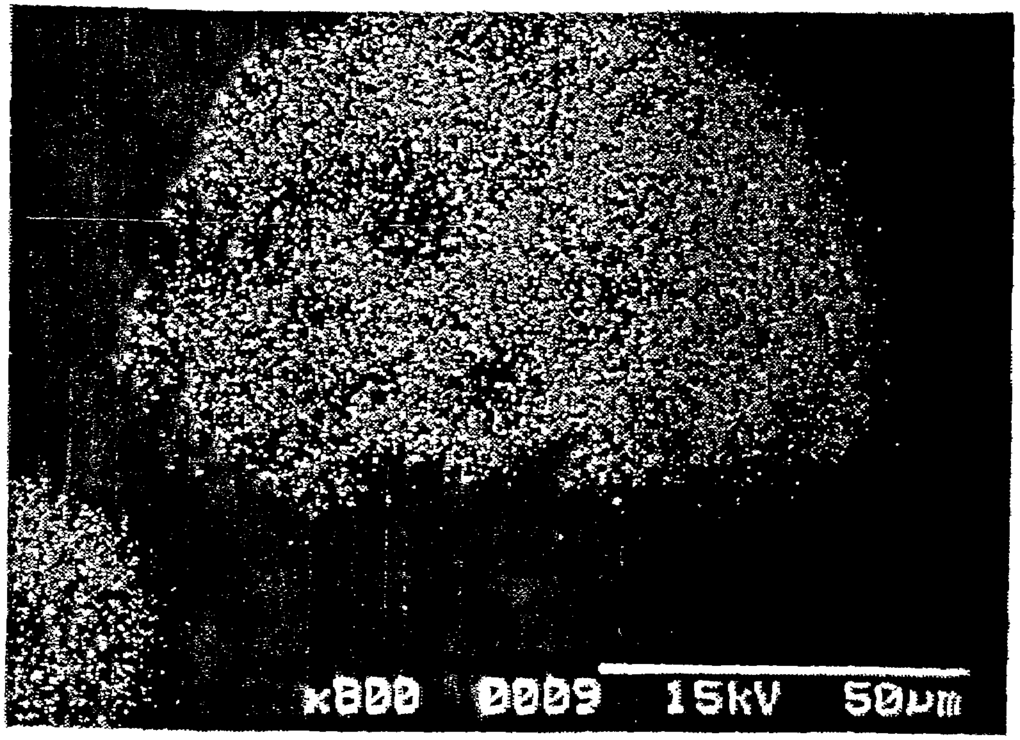
FIG. 4 is an EPMA Si mapping image of the sample of Comparative Example 1.

Another evaluation sample E was formed with a treated sample obtained in a similar manner to the treated sample A of example 1, with the exception that no water was added. For the evaluation sample E, a scanning electron microscope photograph and an EPMA Si mapping image are obtained as shown in FIGS. 3 and 4, respectively.

Example 5

The following composition was prepared and placed into the reaction vessel which was prepared in a similar manner to Example 1, with the exception that the reaction vessel was placed in a 350° C. floating sand bath.

| | |
|---|---|
| Treated sample A | 0.4 part |
| Water | 3.9 parts |

For this composition, the conditions inside the reaction vessel reached a pressure of 35 MPa at 350° C. Namely, the composition was under the subcritical water conditions.

Figure 5:
FIG. 5 is a scanning electron microscope photograph of the sample of Example 5.

The results obtained from a scanning electron microscope photograph (FIG. 5) indicated that almost all silicone coating resin had been removed from the surface of the evaluation sample F and the removal rate for the sample was found as 90%.

Example 6

A carrier B was prepared in a similar manner to Example 1, with the exception that spherical ferrite particles having an average diameter of about 80 microns were used in place of the spherical magnetite particles with about 80 microns average diameter of Example 1. Using the thus prepared carrier B, a developer B was formed in a similar manner to Example 1. Subsequently, using the developer B an evaluation sample G was formed in a similar manner to Example 2.

Figure 6:
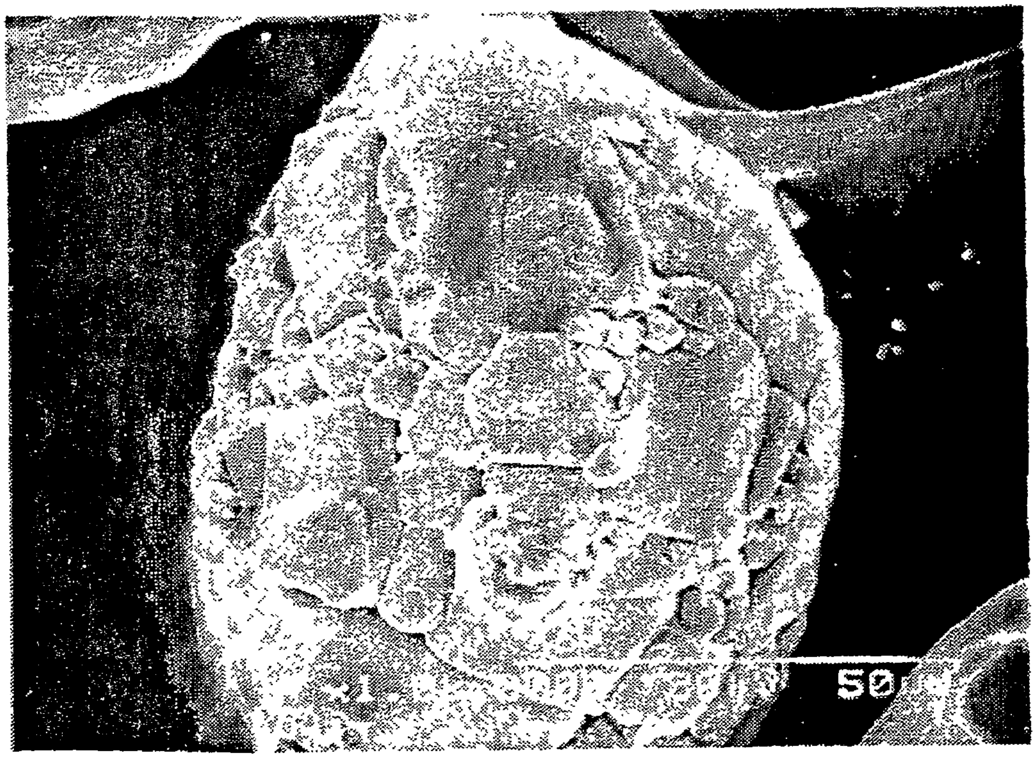
FIG. 6 is a scanning electron microscope photograph of the sample of Example 6.

Results from a scanning electron microscope photograph (FIG. 6) for the evaluation sample G indicated that almost all silicone coating resin had been removed from the surface of the particles, and the removal rate was found to be 95%.

Comparative Example 2

Figure 7:
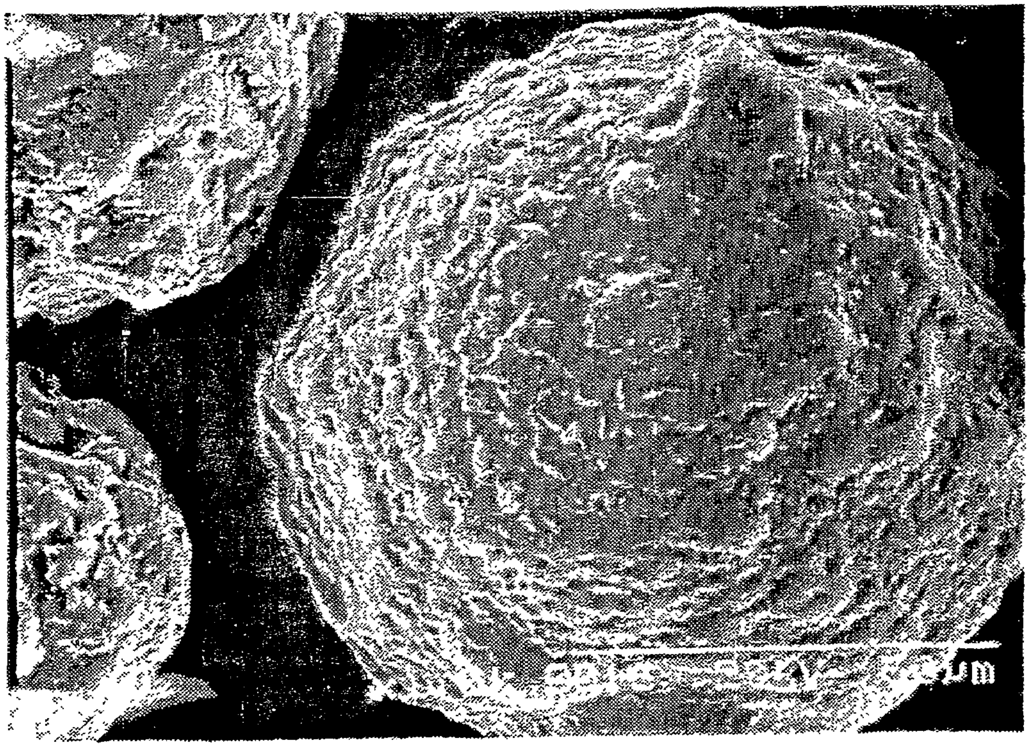
FIG. 7 is a scanning electron microscope photograph of the sample of Comparative Example 2.

A further evaluation sample H was prepared in a similar manner to the treated sample A of example 1, with the exception that 0.4 part of the treated sample B was included and that no water was added. For the evaluation sample H, a scanning electron microscope photograph was obtained as shown in FIG. 7.

TABLE 1

| | Sample | Removal rate of silicone resin | Magnetic material characteristics (saturation magnetization) emu/gr 1 kOe | 5 kOe | 10 kOe |
|---|---|---|---|---|---|
| Example 1 | Evaluation sample A | 80% | 60.5 | 87.4 | 88.4 |
| Example 2 | Evaluation sample B | 95% | 60.6 | 87.5 | 88.3 |
| Example 3 | Evaluation sample C | 80% | 60.4 | 87.6 | 88.6 |
| Example 4 | Evaluation sample D | 95% | 60.5 | 87.7 | 88.4 |
| Example 5 | Evaluation sample F | 90% | 60.3 | 87.4 | 88.3 |
| Example 6 | Evaluation sample G | 95% | 56.3 | 63.5 | 64.5 |
| Comparative Ex. 1 | Evaluation sample E | 0% | — | — | — |
| Comparative Ex. 2 | Evaluation sample H | 0% | — | — | — |
| Virgin core material of Example 1 | | — | 60.5 | 87.4 | 88.5 |
| Virgin core material of Example 6 | | — | 56.5 | 63.7 | 64.9 |

Example 7

Another evaluation sample I was formed in a manner similar to Example 1, with the exception that the supercritical treatments were carried out for the following composition.

| | |
|---|---|
| Treated sample A | 0.6 part |
| Water | 2.8 parts |

For this composition, the conditions inside the reaction vessel reached a pressure of 35 MPa at 400° C.

Figure 8:
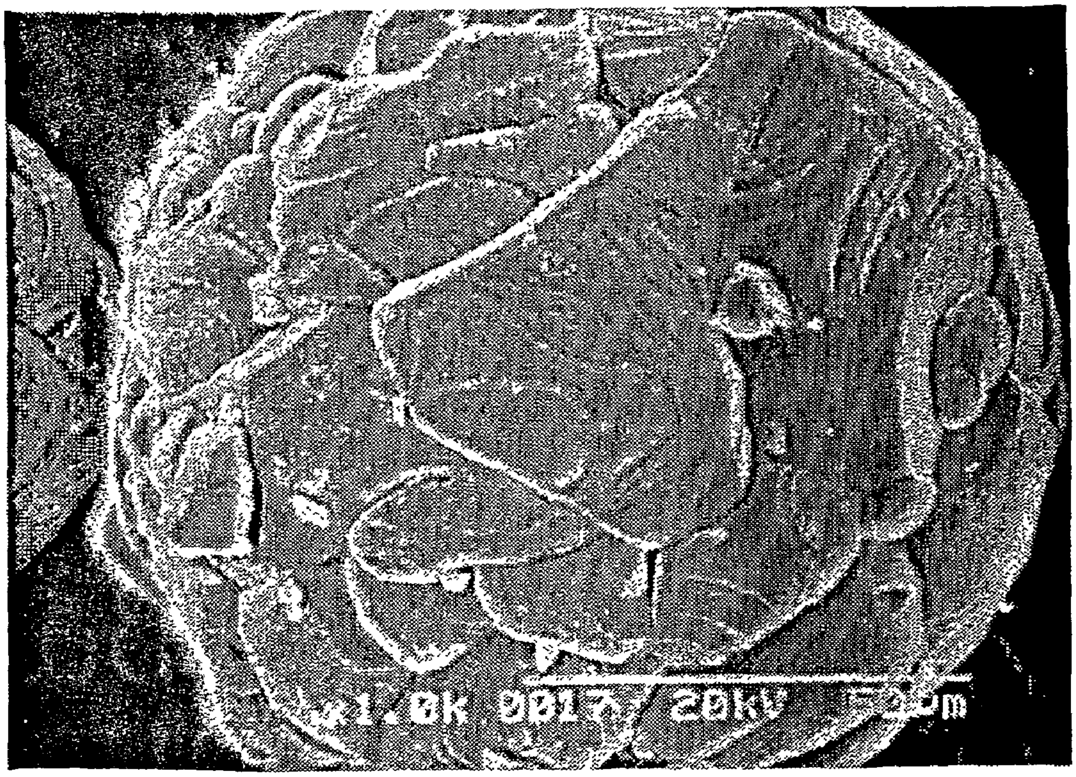
FIG. 8 is a scanning electron microscope photograph of the sample of Example 7.

The results from a scanning electron microscope photograph (FIG. 8) indicated that almost all silicone coating resin had been removed from the surface of the sample I and the removal rate for the sample was found as 90%.

Example 8

An evaluation sample J was formed in a manner similar to Example 1, with the exception that the supercritical treatments were carried out for the following composition.

| | |
|---|---|
| Treated sample A | 1.0 part |
| Water | 2.7 parts |

For this composition, the conditions inside the reaction vessel reached a pressure of 35 MPa at 400° C.

Figure 9:
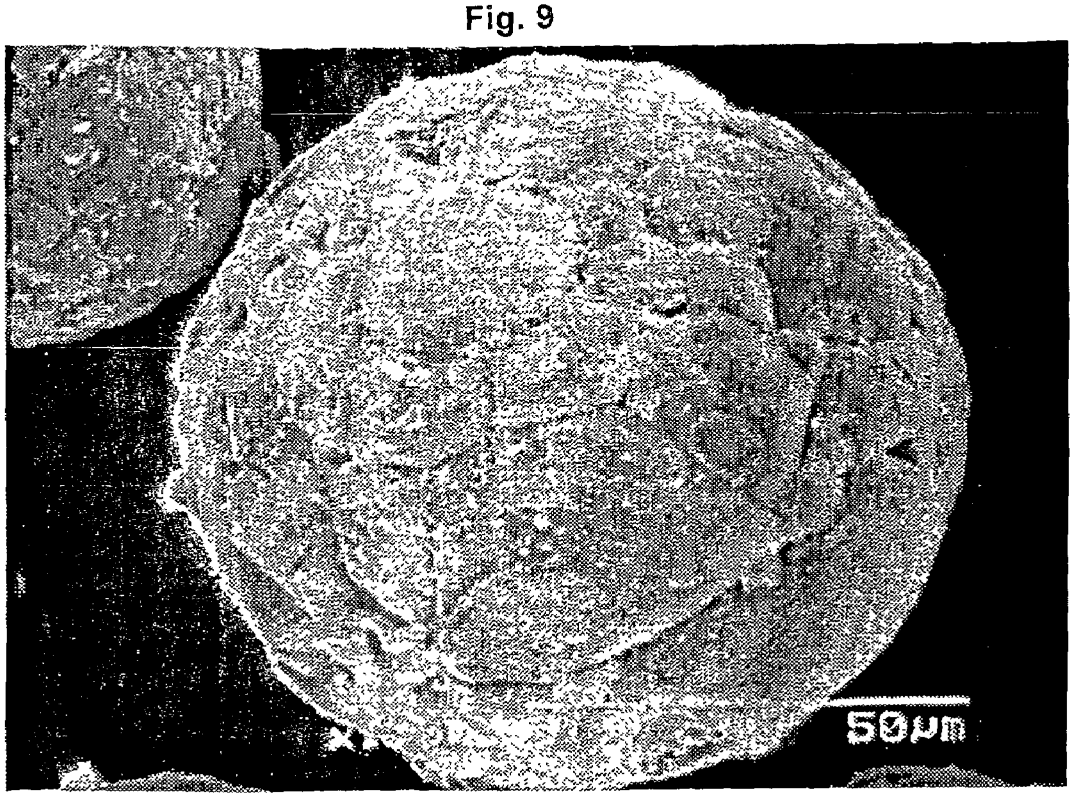
FIG. 9 is a scanning electron microscope photograph of the sample of Example 8.

The results obtained from a scanning electron microscope photograph (FIG. 9) indicated that almost all silicone coating resin had been removed from the surface of the sample J and the removal rate for the sample was found as 80%.

Comparative Example 3

A further evaluation sample K was formed in a manner similar to Example 1, with the exception that the supercritical treatments were carried out for the following composition.

| | |
|---|---|
| Treated sample A | 1.5 part |
| Water | 2.6 parts |

For this composition, the conditions inside the reaction vessel reached a pressure of 35 MPa at 400° C.

Figure 10:
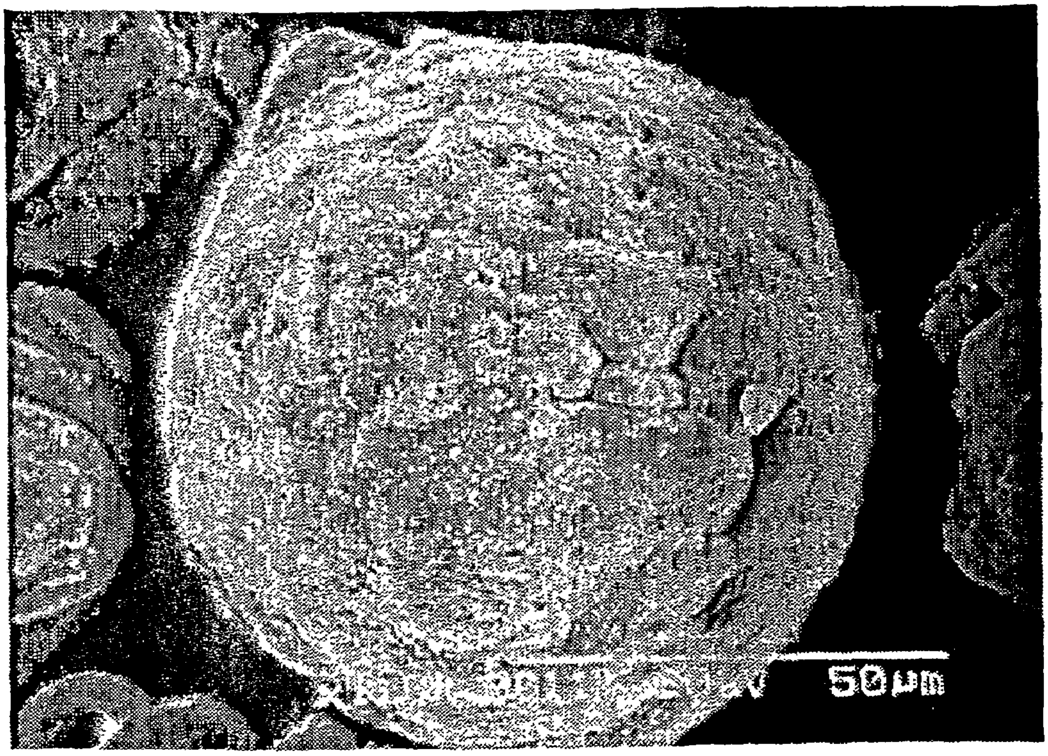
FIG. 10 is a scanning electron microscope photograph of the sample of Comparative Example 3.

The results obtained from a scanning electron microscope photograph (FIG. 10) indicated that almost all silicone coating resin had been removed from the surface of the sample K and the removal rate for the sample was found as 45%.

Example 9

The following composition was prepared and placed in the reaction vessel, which was prepared in a similar manner to Example 1.

| | |
|---|---|
| Treated sample A | 1.5 part |
| Water | 2.6 part |

The reaction vessel was subsequently pressurized with nitrogen to a pressure of 1 MPa to be left for 1 minute, then the pressure was reduced to atmospheric pressure over a period of 30 seconds. The pressurization and decompression processes with nitrogen were repeated three times before sealing the reaction vessel filled with nitrogen. After placing the reaction vessel in a 400° C. floating sand bath to reach an inside pressure of 35 MPa and a temperature of 400° C., then allowing to stand for 1 hour, the vessel was removed from the sand bath to be cooled by immersing into a water bath at normal temperature.

The reaction vessel was opened and the reaction products were taken out and admitted into a glass vessel. The reaction products were rinsed with water while the products were held inside by a magnet which was pressed on the bottom face of glass vessel so that materials other than magnetic materials were removed. The residual particles were then collected and dried in a constant-temperature drying oven at 100° C. for 1 hour, whereby an intermediate sample L-1 was obtained.

The thus prepared intermediate sample L-1 was subsequently processed under similar supercritical conditions to those of Example 1, with the exception that the following composition was utilized, whereby an evaluation sample L-2 was formed.

| | |
|---|---|
| Intermediate sample L-1 | 1.5 part |
| Water | 2.8 parts |

For this composition, the conditions inside the reaction vessel reached a pressure of 35 MPa at 400° C.

Figure 11:
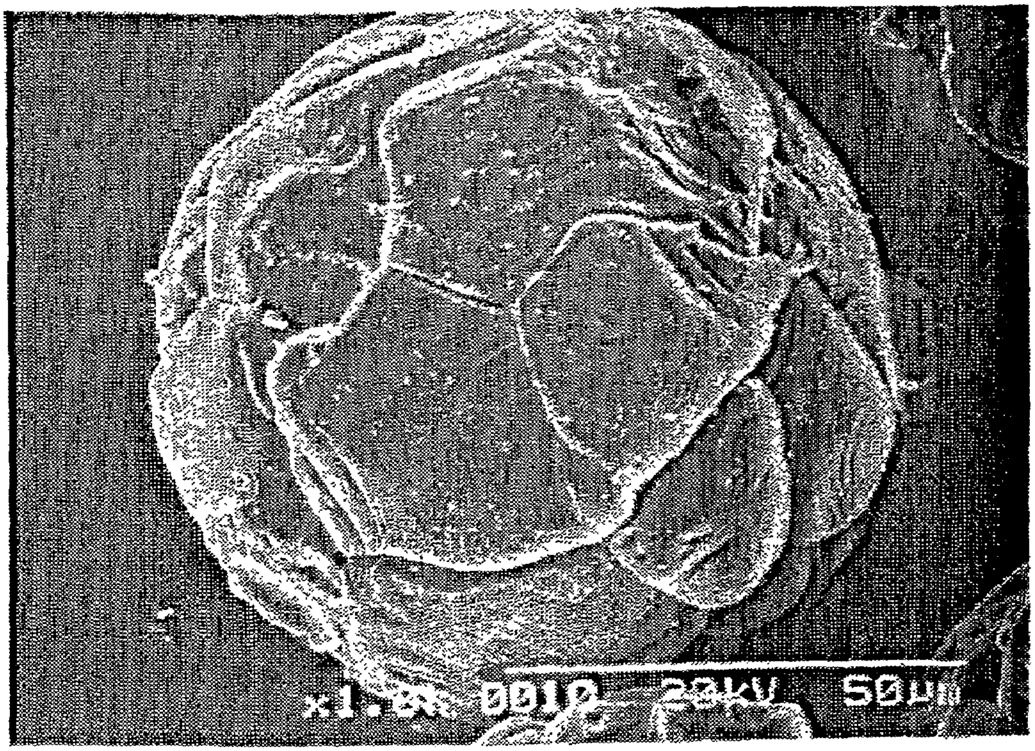
FIG. 11 is a scanning electron microscope photograph of the sample of Example 9.

The results obtained from a scanning electron microscope photograph (FIG. 11) indicated that almost all silicone coating resin had been removed from the surface of the sample L-2 and the removal rate for the sample was found as 95%.

TABLE 2

| | Sample | Weight ratio of water to treated sample used | Removal rate |
|---|---|---|---|
| Example 2 | Evaluation sample B | 7.1 | 95% |
| Example 7 | Evaluation sample I | 4.7 | 90% |
| Example 8 | Evaluation sample J | 2.7 | 80% |
| Example 9 | Evaluation sample L-2 | 5.4 | 95% |
| Comparative Ex. 3 | Evaluation sample K | 1.7 | 45% |

It is apparent from the above description including the examples, that effective separation of a resinous coating material from a magnetic core material becomes feasible in water under super- or sub-critical conditions. With the method described herein, a higher rate of removal is achieved even for tightly bound resinous materials such as thermosetting cross-linked resins and silicone resins, for which effective removal has been difficult to achieve by known method using solvents such as acids and alkalis, or with methods such as hydrolysis and pyrolysis, for example.

Also with the apparatus described herein, the separation is uniform over the entire volume of the material to be processed, thereby also leading to higher removal rate. Further, since magnetic core materials in the carrier is separated without degrading their magnetic properties by the present method, they are effectively used as a recycled magnetic material for forming carrier, and resin monomers recovered from treated solution can also be used efficiently in recycled use.

With the present apparatus incorporating several additional devices such as, for example, a compartment for retaining the carrier, difficulties such as, for example, possible inflow of the carrier particulates into valve portions can be prevented, to thereby increasing the reliability of the separation processes and the apparatus used therefor. In addition, the use of magnetic field for retaining the magnetic material avoids the need of a pressure seal which is otherwise used for an external force to be conveyed mechanically into the reactor. These devices help increase the reliability of the apparatus and obviate undue increase in size and operation costs of the apparatus as a whole, and efficient turnaround of operation of the apparatus is achieved with reduced startup times and downtimes.

Numerous additional modifications and variations of the embodiments described above are possible in light of the above teachings. It is therefore to be understood that within the scope of the appended claims, the present invention may be practiced otherwise than as specifically described herein.

This document claims priority and contains subject matter related to Japanese Patent Applications Nos. 11-213015 and 2000-22778, filed with the Japanese Patent Office on Jul. 28, 1999 and Jan. 31, 2000, respectively, the entire contents of which are hereby incorporated by reference.

What is claimed:

1. An apparatus for separating materials used in a carrier for a two-component dry developer comprising:

a reactor containing super-critical or sub-critical water compositions, wherein the reactor is configured to separate a coating material in the carrier from a magnetic material in the carrier;

a feeding unit continuously feeding the super-critical or sub critical water compositions into said reactor to flow therein in a water flow direction;

a releasing unit continuously releasing liquid and reaction products;

a carrier transfer unit transferring the carrier upstream of the water flow direction in said reactor; and a unit for releasing from said reactor the magnetic material separated from said coating material.

2. The apparatus according to claim 1, in which said magnetic material flows in said reactor in a magnetic material flow direction, and further comprising:

a container retaining the magnetic material released from said reactor, downstream of the flow of said magnetic material in said reactor; and a unit for gradating pressure from a high pressure in said tubular reactor to a lower pressure in said container retaining said magnetic material.

3. The apparatus according to claim 1, in which said reactor comprises a plurality of individual reactors for containing super-critical or sub-critical water compositions, and further including a tubing system for interconnecting said individual reactors, wherein said individual reactors are successively connected to said feeding unit to be fed with super-critical or sub-critical water compositions therefrom.

4. The apparatus according to claim 1, further comprising porous partition devices provided within said reactor io retain said magnetic material, said partition devices being replenished with non-oxidizing substances.

5. The apparatus according to claim 1, further comprising a stirring unit stirring said magnetic material contained in said reactor vessel.

6. The apparatus according to claim 5, wherein said stirring unit comprises a source of a magnetic field used for said stirring.

7. The apparatus according to claim 1, wherein said reactor is tilted from a horizontal configuration, said carrier being transferred upstream the water flow direction, and said releasing unit is situated higher than said feeding unit.

8. The apparatus according to claim 1, further comprising:

a porous compartment for retaining said carrier within said reactor to be subjected to said water compositions for a predetermined period of time and subsequently released.

9. The apparatus according to claim 8, including source of a magnetic field applied to said porous compartment to retain said carrier within said reactor for a predetermined period of time before being released from the reactor.

10. An apparatus for separating materials used in a carrier for a two-component dry developer, comprising:

reactor means for containing super-critical and sub-critical water compositions, wherein the reactor means is configured to separate a coating material in the carrier from a magnetic material in the carrier;

maans for continuously feeding any of the super-critical and sub-critical water compositions into said reactor means;

means for continuously releasing liquid and reaction products;

means for transferring the carrier upstream of a flow direction of the water compositions; and means for releasing from said reactor means the magnetic material separated from the coating material.

11. The apparatus according to claim 10, further comprising:

means for retaining the magnetic material released from said reactor, downstream of a flow of said magnetic material; and means for gradating pressure from a higher pressure in said reactor means to a lower pressure in said means for retaining processed magnetic materials.

12. The apparatus according to claim 10, wherein:

said reactor means comprises a plurality of individual reactor means for containing super-critical or sub-critical water compositions; and said apparatus further comprises tubing means for interconnecting at least each of said reactor means, wherein the individual reactor means arc fed with water compositions individually downstream-wise by said means far feeding said tubing means being switched successively to each of said individual reactor means.

13. The apparatus according in claim 10, further comprising:

porous partition means provided within said reactor moans to retain said magnetic material, said porous partition means being replenished with non-oxidizing substances.

14. The apparatus according to claim 10, further comprising:

means for stirring said magnetic material contained in said reactor means.

15. The apparatus according to claim 10, wherein the magnetic field is applied as a means for stirring.

16. The apparatus according to claim 10, wherein said reactor means is placed tilted from the horizontal configuration, said carrier being transferred upstream of a flow direction of said liquid, and said means for continuously releasing liquid is situated higher than said means for continuously feeding the water compositions.

17. The apparatus according to claim 10, further comprising:

porous compartment means for retaining said carrier within said reactor means to be subjected to said water compositions for a predetermined period of time and subsequently released.

18. The apparatus according to claim 17, including a source of a magnetic field applied for said porous compartment means to retain said carrier within said reactor means for a predetermined period of time before being released.

19. A system for treating carrier used in electrophotography as a component of a developer, said carrier comprising particles that contain at least magnetic material and resinous material, said system comprising:

a reactor configured to separate a coating material in the carrier from a magnetic material in the carrier;

a carrier source supplying a flow of said carrier through the reactor;

a water source supplying a flow through the reactor of at least water at temperature exceeding approximately 200° C. and pressure exceeding approximately 2.5 MPa at least for a time sufficient to achieve substantial separation of said magnetic material and said resinous material from each other;

and an extractor releasing magnetic material separated from resinous material.

20. A system us in claim 19 in which said carrier source and reactor maintain a movement of carrier through the reactor in a carrier movement direccion and said water source and reactor maintain a flow of water through said reactor in a water flow direction opposing the carrier movement direction.

21. A system as in claim 19 in which said reactor comprises a plurality of individual reactor vessels and said system comprises conduits selectively interconnecting said carrier source, said water source, and said individual reactors with each other.

22. A system as in claim 19 including one or more porous containers in which said carrier moves through said reactor, each of said one or more porous containers permitting flow of said water but resisting flow of said carrier through the container.

23. A system as in claim 22 in which said water flows through said reactor a direction different from the direction in which said one or more containers move through the reactor.

24. A system as in claim 23 in which the directions of water flow substantially opposes the direction in which said one or more porous containers move through the reactor.

* * * * *